(12) United States Patent
Lawson

(10) Patent No.: US 9,720,925 B1
(45) Date of Patent: Aug. 1, 2017

(54) SOFTWARE SIMILARITY SEARCHING

(71) Applicant: Orchard Valley Management LLC, Wilmington, DE (US)

(72) Inventor: Nathaniel J. Lawson, Oakland, CA (US)

(73) Assignee: ORCHARD VALLEY MANAGEMENT LLC, Cupertino, CA (US)

( * ) Notice: Subject to any disclaimer, the term of this patent is extended or adjusted under 35 U.S.C. 154(b) by 562 days.

(21) Appl. No.: 13/840,871

(22) Filed: Mar. 15, 2013

Related U.S. Application Data

(60) Provisional application No. 61/623,514, filed on Apr. 12, 2012, provisional application No. 61/623,519, filed on Apr. 12, 2012, provisional application No. 61/623,524, filed on Apr. 12, 2012.

(51) Int. Cl.
*G06F 7/00* (2006.01)
*G06F 17/30* (2006.01)
*G06F 17/22* (2006.01)
*G06F 21/10* (2013.01)

(52) U.S. Cl.
CPC ........ *G06F 17/301* (2013.01); *G06F 17/2211* (2013.01); *G06F 21/105* (2013.01)

(58) Field of Classification Search
CPC .................. G06F 21/105; G06F 17/2211
See application file for complete search history.

(56) References Cited

U.S. PATENT DOCUMENTS

| | | | |
|---|---|---|---|
| 6,126,329 A | 10/2000 | Bennett et al. | |
| 6,282,698 B1 | 8/2001 | Baker | |
| 6,795,963 B1 | 9/2004 | Andersen et al. | |
| 8,065,658 B1 | 11/2011 | Bali et al. | |
| 8,290,962 B1* | 10/2012 | Chu | G06F 17/30622 706/48 |
| 8,831,998 B1* | 9/2014 | Cramer et al. | 705/59 |
| 9,223,554 B1 | 12/2015 | Lawson | |
| 2003/0066025 A1* | 4/2003 | Garner | G06F 17/30654 715/256 |
| 2005/0114840 A1* | 5/2005 | Zeidman | G06F 8/71 717/126 |
| 2006/0080648 A1 | 4/2006 | Anwar et al. | |
| 2009/0089507 A1 | 4/2009 | Chen et al. | |
| 2009/0307201 A1* | 12/2009 | Dunning | G06F 17/30743 |
| 2010/0106640 A1* | 4/2010 | Meury | 705/40 |
| 2010/0242028 A1* | 9/2010 | Weigert | 717/131 |

OTHER PUBLICATIONS

Briones et al., "Graphs, entropy and grid computing: Automatic comparison of malware", Virus Bulletin (2008).
Broder, Andrei Z., "On the resemblance and containment of documents", Compression and Complexity of Sequences 1997. Proceedings. IEEE, 1997.

(Continued)

*Primary Examiner* — Charles Lu
(74) *Attorney, Agent, or Firm* — Downey Brand LLP

(57) ABSTRACT

Similarity analysis of software is disclosed. An input file is received. Pairs of files that consist of the input file and files included in a corpus are categorized into one of a possible match and a mismatch. Those pairs classified as possible matches are analyzed using a pairwise component analysis.

20 Claims, 23 Drawing Sheets

(56) References Cited

OTHER PUBLICATIONS

Burrows et al., "Efficient plagiarism detection for large code repositories", Software: Practice and Experience 37.2 (2007): 151-175.
Dullien et al., "Graph-based comparison of executable objects", SSTIC 5 (2005): 1-3.
Gheorghescu, Marius, "An automated virus classification system", Virus bulletin conference. 2005.
Hu et al., "Large-scale malware indexing using function-call graphs", Proceedings of the 16th ACM conference on Computer and communications security. ACM, 2009.
Kruegel et al. "Polymorphic worm detection using structural information of executables." Recent Advances in Intrusion Detection. Springer Berlin Heidelberg, 2006.
Kruskal, Joseph B., "On the shortest spanning subtree of a graph and the traveling salesman problem", Proceedings of the American Mathematical society 7.1 (1956): 48-50.
Schwarz et al., "Disassembly of executable code revisited", Reverse Engineering, 2002. Proceedings. Ninth Working Conference on. IEEE, 2002, 10 pages.

\* cited by examiner

600 ⤴

| Variable | Referencing function | Read | Write |
|---|---|---|---|
| Integer_1 | Main | X | X |
| Integer_2 | Main |  | X |
|  | init | X |  |
|  | fnC | X |  |

602 — (top row bracket)
604 — (Integer_2 rows bracket)

SOFTWARE SIMILARITY SEARCHING

CROSS REFERENCE TO OTHER APPLICATIONS

This application claims priority to U.S. Provisional Patent Application No. 61/623,514 entitled RECOVERING SOURCE CODE STRUCTURE FROM PROGRAM BINARIES filed Apr. 12, 2012; to U.S. Provisional Patent Application No. 61/623,519 entitled SOFTWARE SIMILARITY SEARCH IN SOURCE AND BINARY FORM filed Apr. 12, 2012; and to U.S. Provisional Patent Application No. 61/623,524 entitled SOFTWARE ANALYSIS TOOLS filed Apr. 12, 2012; each of the aforementioned applications is incorporated herein by reference for all purposes.

BACKGROUND OF THE INVENTION

Computer programs often comprise a combination of new source code, and previously written source code. An author of a given program may be authorized to include the previously written source code (e.g., due to a license with which the author is in compliance), but the author of the program may also not be authorized to include the previously written source code. It can sometimes be difficult to determine whether a given program includes previously written source code. For example, some programmers employ obfuscation techniques to hide the origin of code. As another example, existing techniques for inspecting source code will not work where no source code is available (e.g., where the only software available for inspection is in binary form.

BRIEF DESCRIPTION OF THE DRAWINGS

Various embodiments of the invention are disclosed in the following detailed description and the accompanying drawings.

FIG. 6 illustrates an example of a data-function table.

FIG. 17 is an example of match details for a single pair of files.

FIG. 22 illustrates an example of an invoice report.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
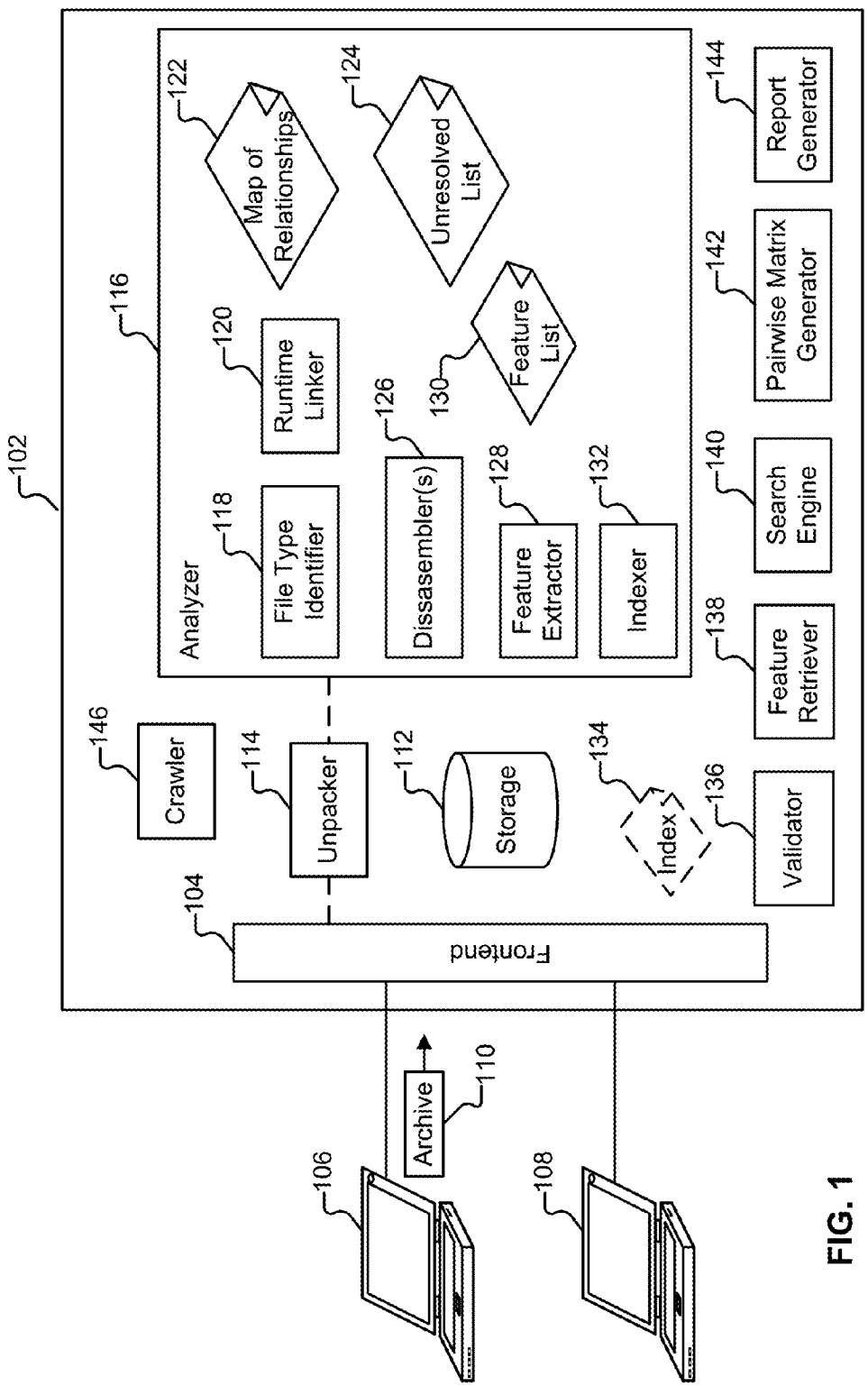
FIG. 1 illustrates an embodiment of an environment in which software is analyzed.

FIG. 1 illustrates an embodiment of an environment in which software is analyzed. As will be described in more detail below, system 102 can be used to perform a variety of tasks, including flexible software licensing, software misuse/theft analysis, qualitative analysis, and depreciation calculations, as well as other applications.

In some embodiments, system 102 comprises a single device, such as standard commercially available server hardware (e.g., with a multi-core processor, 8+Gigabytes of RAM, and one or more Gigabit network interface adapters) and runs a typical server-class operating system (e.g., Linux). System 102 can also be implemented using a scalable, elastic architecture and can comprise several distributed components, including components provided by one or more third parties. For example, in some embodiments all or portions of system 102 are implemented using services such as Amazon's EC2 and S3. Further, when system 102 is referred to as performing a task, such as storing data or processing data, it is to be understood that a sub-component or multiple sub-components of system 102 (whether individually or in cooperation with third party components) may cooperate to perform that task. Further, certain tasks may be distributed such that a given task is accomplished by multiple instances of a component depicted in FIG. 1 as a single component.

In the example shown in FIG. 1, a user of client device 106 provides a software archive 110 for ingestion into system 102 via a frontend 104. A software archive is a collection of one or more files, examples of which include software executables, installers, ZIP files, ROMs, firmware images, etc. As one example, a representative (hereinafter "Alice") of a company (hereinafter "ACME Corporation") can provide a copy of a mail client application to system 102 via frontend 104. The application software provided by Alice can be a single executable file, and can also comprise a bundle of multiple files, e.g., multiple binaries which work together in cooperation, documentation, etc.

In the example shown in FIG. 1, frontend 104 is a web frontend, and Alice provides the mail application to system 102 by interacting with a website (i.e., uploading the application via a web form she accesses with a browser application installed on client 106). System 102 can also include one or more other frontends instead of or in addition to the web frontend of FIG. 1. For example, system 102 can make available an application programming interface (API) for ingesting software archives. As will be described in more detail below, frontend 104 can also be used (e.g., by Alice or a user of client 108) to perform a variety of analytical activities.

A copy of the archive 110 is stored in storage 112 (which is, in some embodiments, Amazon S3). The archive is also provided to unpacker 114. Unpacker 114 recursively operates on the archive, unzipping/unpacking any containers included in archive 110, and extracting any individual files. As applicable, tools such as 7-Zip are used in the unpacking. The individual files included in an archive can be of a variety of heterogeneous file types. For example, archive 110 could include both executables, and license/help files that are written in HTML. In some embodiments, the files extracted by unpacker 114 are also stored in storage 112 (e.g., along with metadata indicating that the files were received from Alice, are associated with a particular package, etc.).

Figure 2:
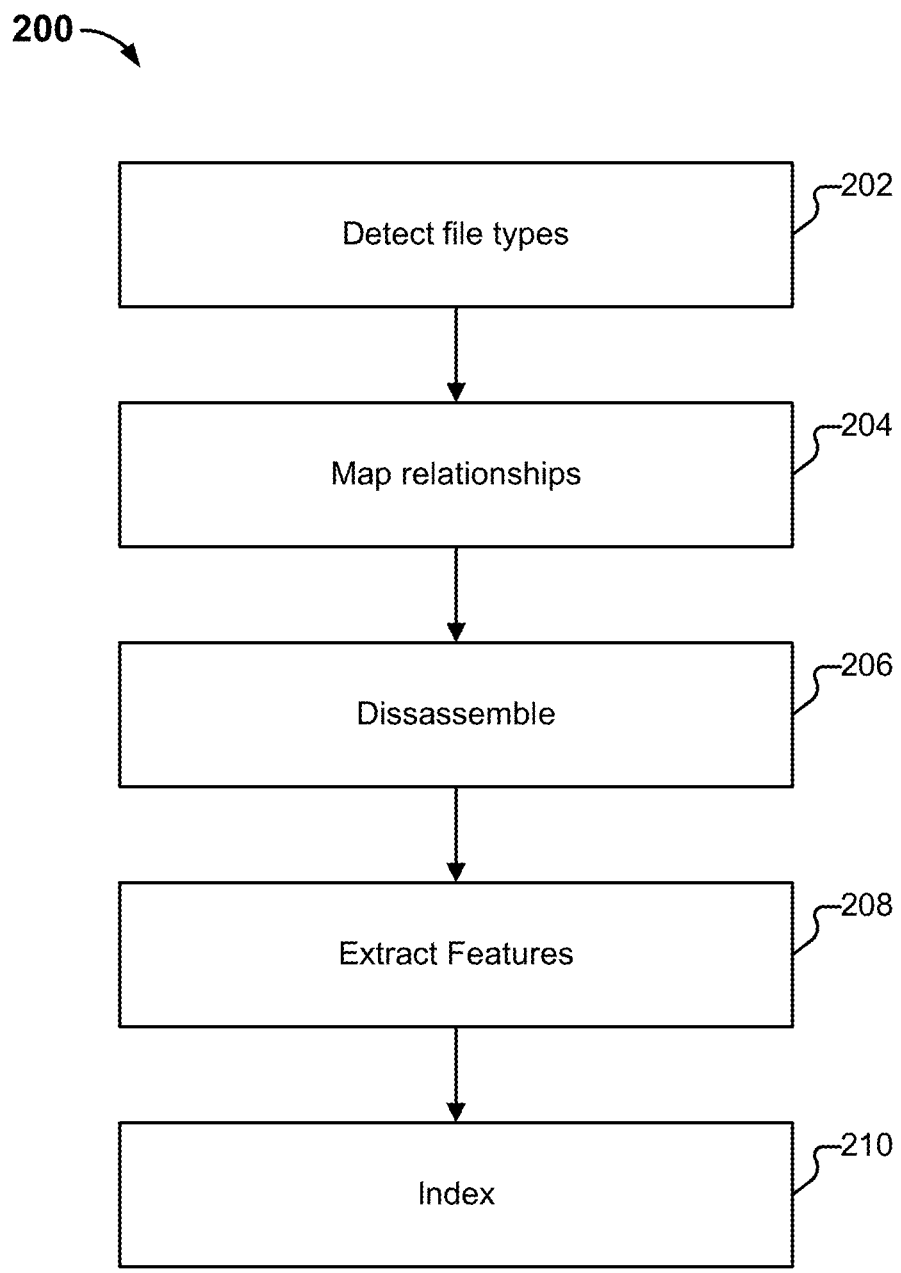
FIG. 2 illustrates an embodiment of a process for ingesting an archive.

The extracted files are provided to analyzer 116, which performs a variety of operations in response to receiving files for analysis. As shown in FIG. 1, analyzer 116 comprises several components which act in cooperation. Metadata associated with processing performed by system 102 (or components thereof) is collected and stored (e.g., using the PostgreSQL database system). In various embodiments, at least some of the components are omitted from analyzer 116 and/or the processing performed by at least some of the components is optional. An overview of the functionality provided by each of the components of analyzer 116 will now be described in conjunction with an embodiment of an ingestion process depicted in FIG. 2. Additional detail is provided below. In some embodiments, process 200 is performed by analyzer 116.

Given a file, file type identifier 118 determines its type (202). For example, file type identifier 118 can determine whether a file is an executable, an image, source code, help documentation, license file, or other file type. One example of a file type identifier is the Unix "file" command. In some embodiments, license files are detected by scanning for the presence of indicating words such as "copyright" and "license." Additional processing is performed on certain types of files (e.g., executables). For example, runtime linker 120 is configured to examine each of the executables and determine any explicit relationships between them. Examples of runtime linkers include ld.so and rtld. Suppose a dynamic library and an executable that uses the library are present in archive 110. Runtime linker 120 is configured to determine which functions are exported from the dynamic library, which functions are imported by the executable, and store any matches between those functions in runtime relationship map 122 (204). Analyzer 116 also maintains a list 124 of unresolved dependencies (e.g., functions that an executable imports but are not present in any libraries in the archive). In some embodiments, dependencies are unresolved for benign reasons (e.g., an application makes use of a library provided by an operating system that is not included in the archive). Dependencies may also be unresolved for deceptive reasons (e.g., an author of the executable might intend to conceal use of an unlicensed library by asking a user to download the library from a website, or cause the library to be automatically downloaded as part of an installation process, rather than including the library in the package). In some embodiments, the list of unresolved dependencies is submitted to the process of steps 308-314 in order to resolve them by finding existing libraries in the corpus saved in storage (112).

Executables are provided to disassembler 126 for disassembly (206). In some embodiments, a commodity disassembler is used, such as IDA Pro. In other embodiments, a customized disassembler is used. For example, certain tasks performed by a traditional disassembler (e.g., resolving every pointer reference within a program or determining what variables can take on which values) can be omitted as an optimization. In some embodiments, the disassembly is performed, in parallel, across multiple nodes. For example, where four EC2 nodes are available, the executables of the archive are distributed amongst the four nodes for disassembly and the results collected back by a coordinator for further use by analyzer 116. In some embodiments, the disassembly information is also stored in storage 112.

Output of the disassembly performed at 206 is provided to a feature extractor 128. The feature extractor uses the output and the runtime relationship map 122 to create a list of features 130 (208). The feature list enumerates structural features, such as which functions call one another. The feature list also enumerates syntactical features, such as the sequence of operations performed by a function. The feature list also includes features that are extracted directly from the executable without requiring disassembly, such as the list of exported functions from a given DLL, snippets of raw data, and strings. In some embodiments, filtering/transformation is performed in conjunction with the feature list generation, as described in more detail below.

Finally, indexer 132 creates an inverted index 134 that stores feature information with references back to the originating executables. In some embodiments, Apache Lucene is used. As will be described in more detail below, analyzer 116 is also configured to perform processing pertaining to the internal structural recovery of a given binary.

In various embodiments, system 102 is configured to ingest open source software from authoritative sources. For example, crawler 146 can crawl a website such as freebsd.org/ports for software packages, and process the software (e.g. in accordance with process 200), including by associating the software with a manifest that indicates any licenses it is subject to, the authors of the software, etc.

Figure 3:
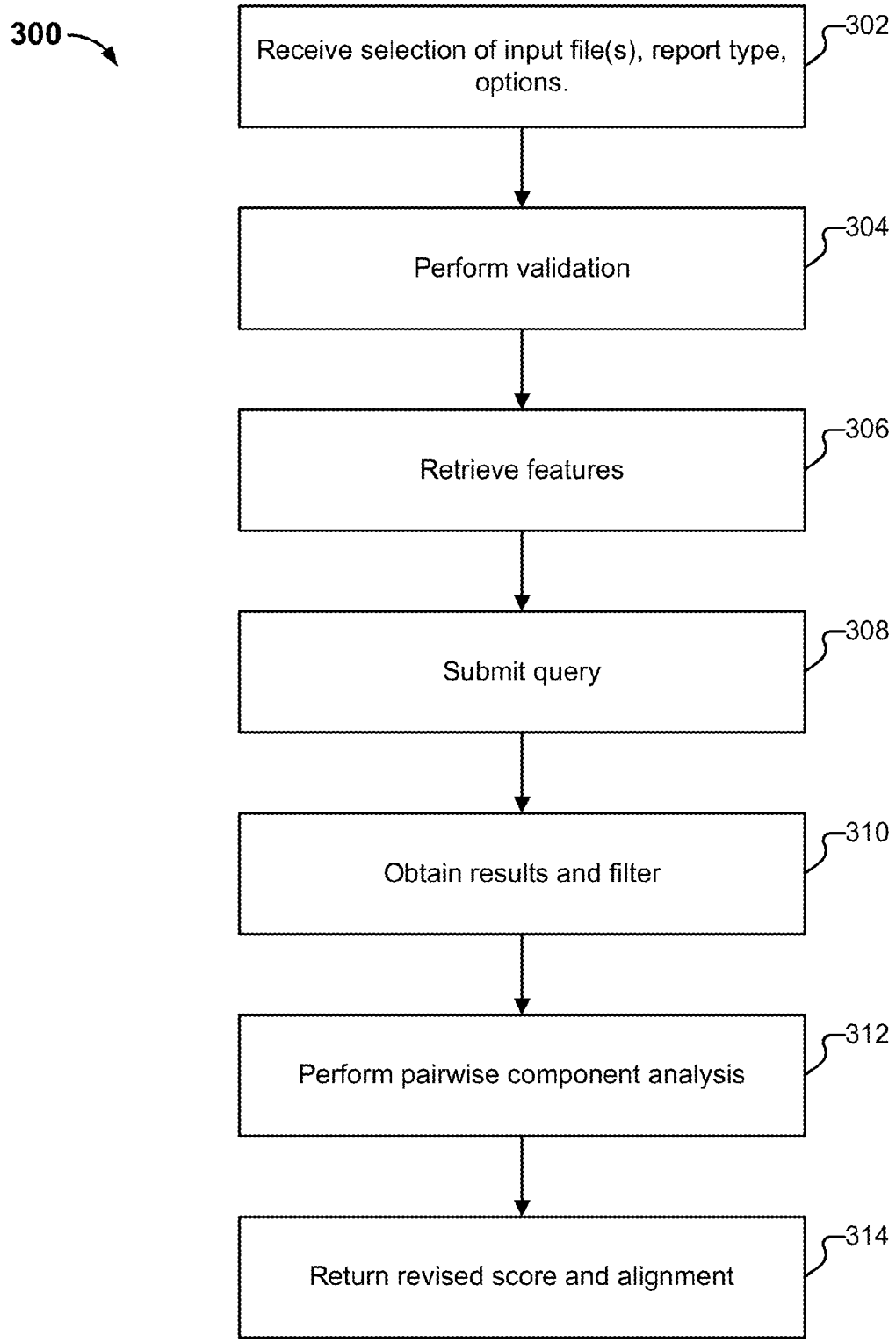
FIG. 3 illustrates an embodiment of a process for searching.

As will be described in more detail below, data obtained by analyzer 116 can be used in a variety of ways, such as to perform searches. An overview of components of system 102 used in searching will now be described in conjunction with an embodiment of a search process depicted in FIG. 3. Additional detail is provided below. In some embodiments, process 300 is performed by system 102.

Users of client devices, such as client devices 106 and 108, can use an interface provided by frontend 104 to perform a variety of searches and receive results in a variety of report formats. As one example, the user of client device 106 can use system 102 to determine whether any open source materials have been included in archive 110. Specifically, after Alice has provided the mail client application to system 102 (i.e., in conjunction with process 200), Alice indicates to system 102 that she would like to audit the upload for the presence of open source software (302). Alice can also specify any applicable options, such as that she is only concerned with the presence of GPL software (or a specific version, e.g., GPLv2) and is not concerned about BSD software.

Upon receiving Alice's request, the request is validated (304) by validator 136. Validator 136 performs checks, such as making sure that the software to be analyzed (i.e., archive 110) was fully/properly ingested into system 102. Next, feature retriever 138 retrieves (e.g., from storage 112) the feature set associated with archive 110 (306). The retrieved feature set is submitted as a query (308) to search engine 140. Search engine 140 will obtain a set of results (310) including a matching, a document identifier, and a scoring, in descending order. In some embodiments, the results are filtered using the scoring. Those results with a score below a threshold (i.e., indicating a match below a threshold) are filtered out. Next, a pairwise component analysis is performed (312) by pairwise matrix generator 142, as will be described in more detail below. In some embodiments, the pairwise component analysis is performed, in parallel, across multiple nodes. For example, where four nodes are available, the analysis can be split between the four nodes, and the results collected back by a coordinator for further analysis. Iterative improvement can optionally be performed, also as described in more detail below. Finally, revised scores and alignment information is provided to report generator 144 (314), which generates an appropriate report based on report type/options selected at 302.

Recovering Source Code Structure from Program Binaries

As explained above, analyzer 116 is configured to perform processing pertaining to the internal structural recovery of a given binary. Various techniques for recovering various structural aspects of original source code of a program, given only the corresponding binary program (executable) will now be described.

Most code is written in a high-level language. It is then compiled and linked into an executable or library. A compiler typically creates executables from a number of components. First, each source code file is compiled into a linker object, which contains the code (functions) and data (variables) generated from the source code. A linker then combines multiple linker objects into an executable. Often, there is an intermediate step where multiple linker objects are combined into a static library, which is then linked into the executable. (This is just for programmer convenience—linker objects are treated the same way by the linker, whether or not they are grouped in a static library). Finally, the linker merges the code and data from each linker object into a single executable.

If compilation and linking are performed in debug mode, the linker objects and final executable may contain symbols and related debug information that conveys metadata about the executable such as the original file names, line numbers, function and variable names, etc. With other compilers, such debug information is stored in a separate file (e.g., Microsoft's PDB file format). As with the import/export tables created during explicit dynamic linking, symbols and debug information give a programmer or debugger information about the original source code and thus can be helpful when working with executables. Unfortunately, symbols and debug information are not always included with production software releases.

Source code files can include a combination of high-level language code (C, C++, Java, C#, Fortran, etc.) and assembly code (x86, ARM, etc.). They also include various compiler annotations, macros, comments, etc. Examples of linker object types include the ELF ".o" and Microsoft ".obj" formats. Examples of static library types include ".a" files (also known as the Unix ar format) and .lib files (Microsoft LIB format).

Another linking approach is to combine linker objects into a dynamic library. Dynamic libraries are referenced from the executable but not included directly in the file itself as with static linking Usually, dynamic linking is explicit, where the executable lists the name(s) of each library and the functions and/or data the executable uses from it (i.e., imports). Likewise, the dynamic library includes a table listing functions and/or data it provides to executables (i.e., exports). This is different from implicit dynamic linking, where the program typically calls an operating system API to load and reference functions and/or data in a dynamic library instead of using the explicit imports approach.

With explicit dynamic linking, the executable and the dynamic libraries it references are combined by the operating system's dynamic linker/loader when the executable is run. Since the import/export tables explicitly specify the relationship between the executable and the dynamic libraries it uses, the boundary between executable and such libraries is usually apparent.

Functions and data are stored in each executable or dynamic library file. The runtime loader maps sections of these files into memory when they are executed, which means that items that appear earlier within a section of a file are at lower memory addresses than those later in the file that are in the same section.

For example, consider a linker object that contains Function1 at offset 100 and Function2 at offset 200, both within the same code (text) section. When loaded, Function2 is usually at a higher memory address than Function1. In fact, it is usually exactly 100 bytes higher in memory than Function1 since most loaders directly map program file sections to a base address in memory, retaining the relative offsets among functions and data (but not necessarily between the different sections for code and data).

As used herein, the term "address" refers to the relative location of a function or data item in relation to others of its same kind in the same section, whether or not the file is ever loaded and executed. This usage is interchangeable with the terms "file offset," "memory address," "location in address space," etc.

One of the linker's tasks is to enforce function and data scope. For example, the C "static" keyword indicates a function or data item that can only be referenced by functions or data items within the same source code file (and thus linker object). Such functions are sometimes referred to as having "local" visibility. Otherwise, functions are visible anywhere in the program ("global"). Information in each linker object describes each function or data item and its scope, allowing the linker to generate warnings or errors due to improper usage.

Static linking often discards information about the boundaries between linker objects and the static libraries that originally contained them. The linking process generally also discards other information, such as function and variable names, function and data scope, parameters, types, etc. Since the executable and the code/data inside it are self-contained, this information is no longer needed at runtime for the program to execute. The linker only needs it during the linking process to detect problems, such as undefined or conflicting function and/or data symbols. Once linking is complete and the executable or library has been created, this information is no longer needed and can be discarded.

During the static linking process, linkers usually leave out entire linker objects that are not referenced by other linker objects. This saves disk space and memory at runtime that would have been wasted on unused code/data. Linkers may also leave out individual unused functions and/or data while including others from the same linker object (aka "dead code/data elimination"). Often, this behavior depends on the particular linker in use and its optimization settings.

For example, consider a linker combining the linker objects a.o, b.o, and c.o into an executable. Function A in a.o calls function B in b.o, but neither calls function B2 in b.o or any functions in c.o. Most linkers will not include any code or data from c.o in the final executable. Some may also leave out function B2 since it is also unused ("dead code"), but still include function B. Others may include both B and B2 since they are only configured to make decisions about entire linker objects and B is used by function A.

Figure 4:
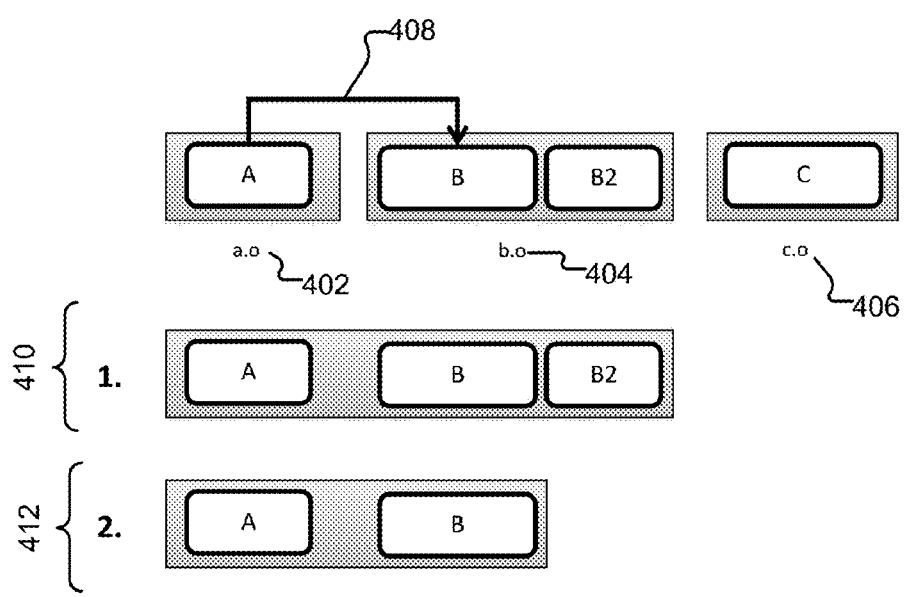
FIG. 4 illustrates an example of two different linking behaviors.

FIG. 4 illustrates an example of two different linking behaviors. Three linker objects (402-406) are being combined. The only function call is between A and B (408). In the first case (410), the linker includes all of b.o, even though B2 is unused. In the second case (412), the linker is able to see that B2 is not used and thus exclude it.

If compilation and linking were performed in debug mode, the linker objects and final executable may contain symbols and related debug information that conveys metadata about the executable such as the original file names, line numbers, function and variable names, etc. With other compilers, such debug information can be stored in a separate file (e.g., Microsoft's PDB file format). As with the import/export tables created during explicit dynamic linking, symbols and debug information give a programmer or debugger information about the original source code and thus are very helpful when working with executables. However, symbols and debug information are not usually included with production software releases.

1.0 RECOVERING INFORMATION

The information conveyed by symbols and debug data is useful but usually not provided. Disclosed herein are techniques for recovering the following example types of information, portions thereof, or representations thereof. Such various techniques described herein can be applied, given only an executable with no symbols or debug information.

Boundaries between sets of functions, grouped as in the original source code file(s);
Boundaries between sets of functions, grouped as in their containing static library(ies);
Function scope/visibility;
Data scope/visibility;
Boundaries between sets of static/global data, grouped as in the original source code file(s) or containing static library(ies);
Number, order, and relative sizes of linker objects and/or static libraries specified to the linker; and
Sets of functions that constitute an API.

In some cases, the lossy compilation and linking process precludes recovery of exactly the same information present in the original source code. However, in such circumstances, a close approximation of each of these items can often be recreated.

Compilers and linkers usually behave in a predictable way that implicitly retains some of the original information about the program and build configuration:

1. The compiler maintains the relative order of functions and data from the original source code file when generating each linker object. That is, a function or static/global variable found earlier in the source code file is also present earlier in the linker object compared to other functions or static data, respectively.

2. The compiler handles functions and data separately. Functions are stored in their own area of the linker object, sometimes called the "text section." Pre-defined data is stored in another area, sometimes called the "data section." The linker only maintains the relative order of functions and data within their respective sections. The order of the text and data sections themselves within the executable is irrelevant in some embodiments.

3. The linker maintains the order of functions and static data in the linker object when including them in the final executable. It may discard unused functions and/or static data, but the original order of the remaining items is maintained. This means there may be gaps, but the original order remains. The linker has two lists of elements to place in the final executable (functions and data). It appends items to each of these separate lists as it encounters them while traversing the file from start to end.

4. The linker usually discards entire linker objects which do not contain functions and/or data referenced from other linker objects.

5. The linker maintains the order of linker objects within each static library. A static library, such as Unix ".a" or Windows ".lib" files, is a container with an ordered collection of linker objects. If the file a.o is stored before b.o within a static library, it will also be stored in the final executable in the same order.

6. The linker maintains the order that linker objects are specified on the command line or build configuration. For example, if a.o is listed before b.o, then the functions and data in a.o each appear before their counterparts in b.o.

7. The linker maintains the order that static libraries are specified on the command line or build configuration. For example, if libfirst.a is listed before libsecond.a, then the functions and data in libfirst.a each appear before their counterparts in libsecond.a.

Programmers tend to organize their code in order to limit scope of functions and data, exposing a smaller API than if everything was visible everywhere. This is called "encapsulation." They also decompose larger tasks into a number of subroutines.

Figure 5:
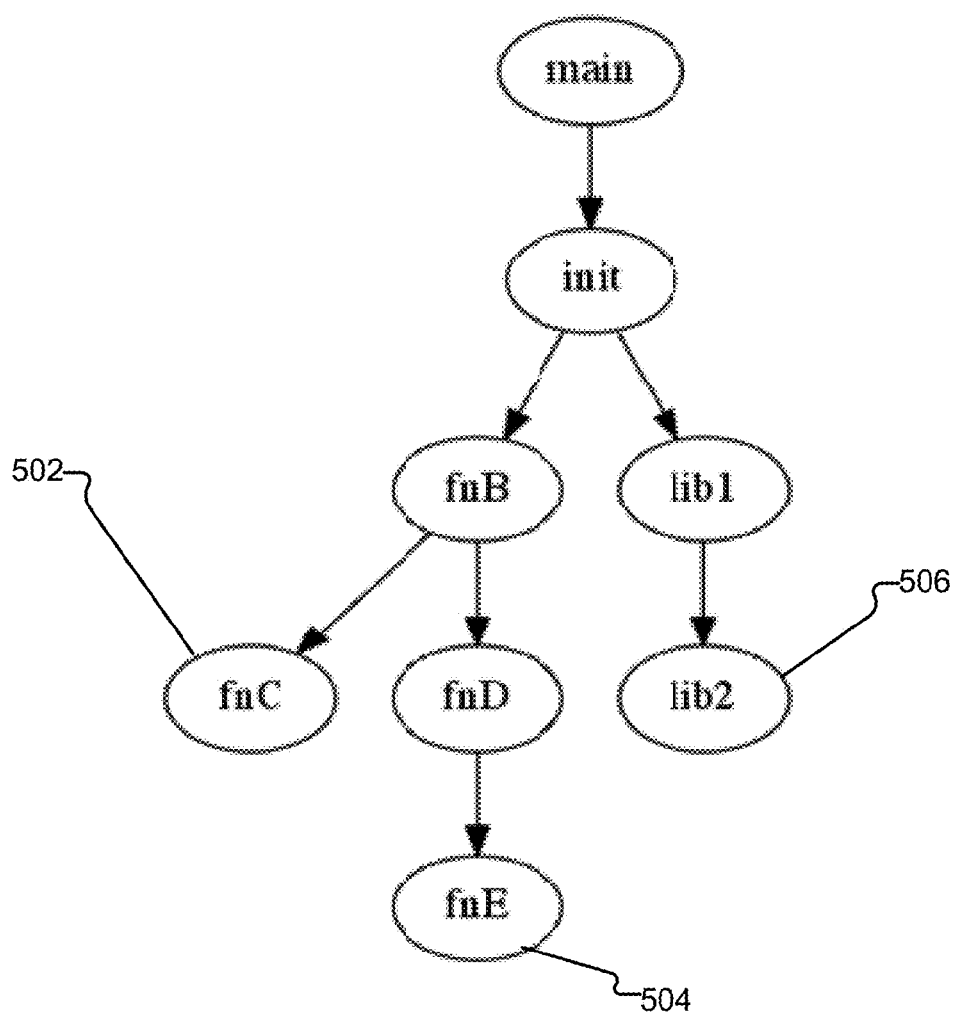
FIG. 5 illustrates an example of a callgraph.

The hierarchy of functions created by the programmer is visible through a program's callgraph. The callgraph shows the relationships among a program's subroutines. A callgraph lists each of a program's functions as a node and each call between functions as a directed edge. The edge is drawn from each caller to callee. As used herein, multiple calls from the same caller to the same callee function are collapsed into a single edge. An example of a callgraph is depicted in FIG. 5. In callgraph 500, the leaf functions (those with no callees) are fnC (502), fnE (504), and lib2 (506).

A function-data table lists, for each function, which data items it references (reads or writes, also known as loads or stores). A data-function table lists, for each data item, which functions reference it (reads from or writes to it). These tables show the relationship between a program's functions and data items. An example of a data-function table is depicted in FIG. 6. In table 600, Integer_1 is read/written from just main (602), while Integer_2 is written from main and then read from both init and fnC (604). A "cross reference map" is used herein to mean a data structure that includes function/data and/or function-to-function references. A cross reference map can be implemented using a variety of common data structures such as arrays, lists, hash tables, trees, etc.

Figure 7:
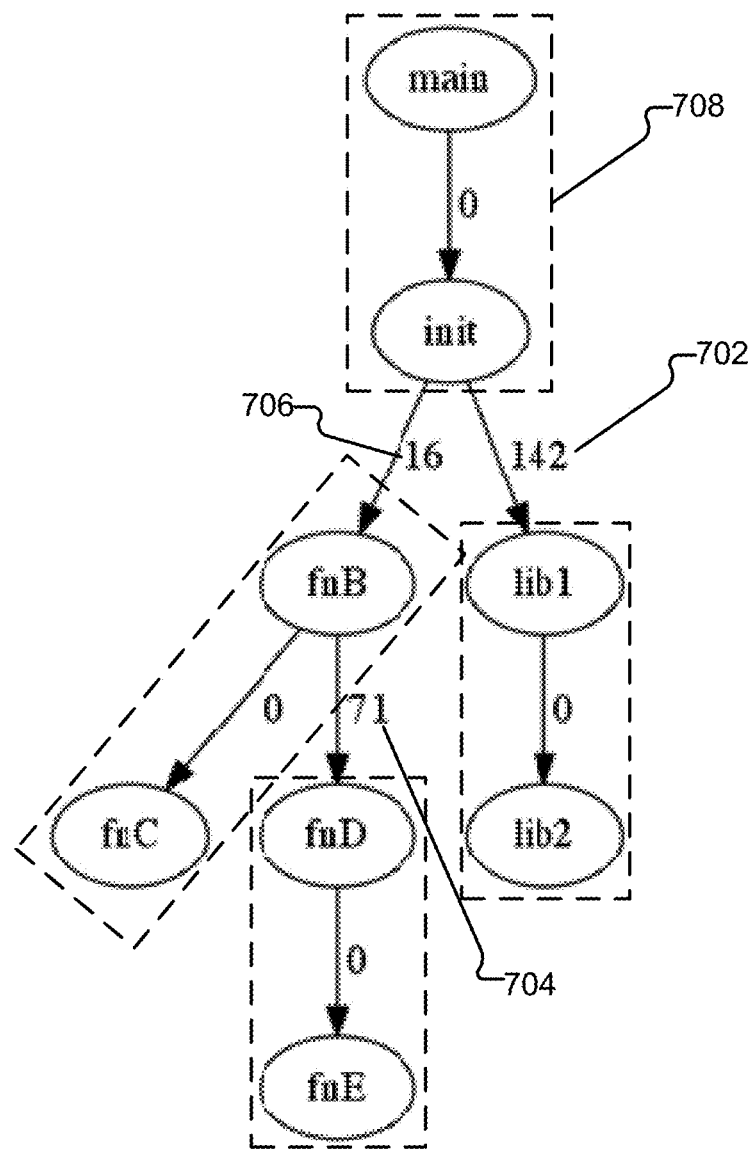
FIG. 7 illustrates an example of a callgraph.

FIG. 7 illustrates an example callgraph whose edges have been labeled with the address distances of each caller/callee function pair. Its linker object boundaries are visible in the edges with larger address distances. The edges with distances 142 (702), 71 (704), and 16 (706) correspond to linker object boundaries in the original code. These boundaries are indicated by dashed boxes (e.g., box 708).

Figure 8:
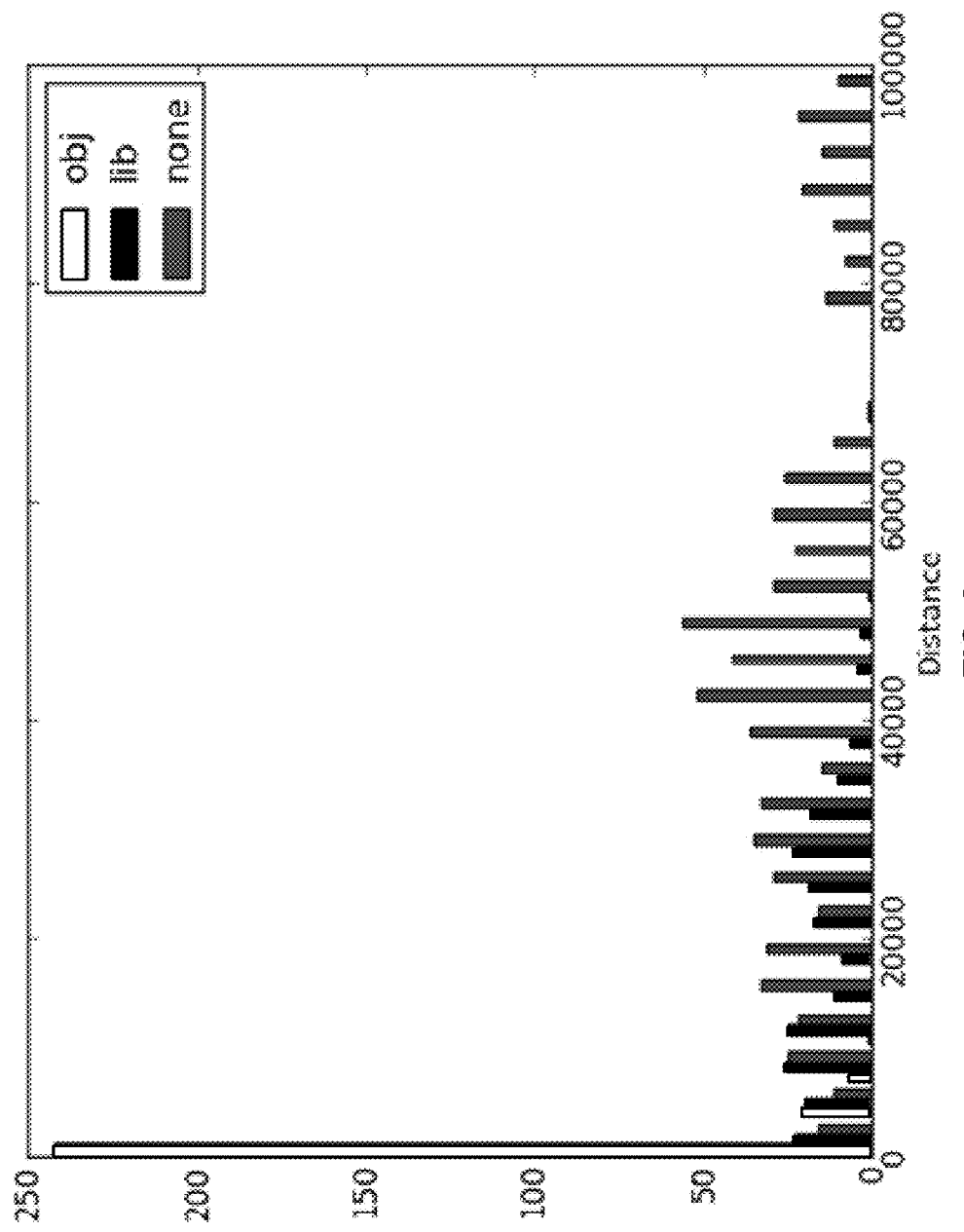
FIG. 8 illustrates an example histogram of callgraph distances for an example program.

FIG. 8 illustrates an example histogram of callgraph distances for an example program. It includes two static libraries and a number of linker objects. Relationships sharing the same linker object ("obj") are clearly distinct from the other two. However, there is significant overlap between "same library" and "neither," and those two distributions are difficult to distinguish from just this diagram. Other techniques, such as are disclosed in the below section titled "1.3 Recovering static library function boundaries," are usable to more easily distinguish them.

By combining information from a program's callgraph and data-function table with the address layout of its functions and data, many aspects of its original structure can be recovered.

1.1 Recovering Approximate Boundaries for Groups of Functions

The following is an example of a process for identifying collections of functions that have close addresses in the executable, and thus are likely related in the original source code. In some embodiments, the process is performed by analyzer 116.

This process includes a graph traversal step. This can be performed using a variety of approaches for finding all connected nodes in a graph, given a starting node. Examples include depth-first search (DFS) and breadth-first search (BFS). The graph can be represented by various data structures, such as an adjacency list or adjacency matrix.

Given the following prerequisites:
1. The value PROXIMITY, defined to be the maximum allowable address distance between two functions before they are considered unrelated.
2. An executable file to be analyzed.

Perform the following actions:
1. Identify and disassemble instructions in the executable, including keeping track of which instructions constitute a function (e.g., addresses of exported/named functions, targets of a call instruction, etc.). In some embodiments, this portion of the process is performed by a disassembler, such as disassembler 126.
2. Create an undirected graph, where nodes represent functions and edges indicate nodes that are related.
   a. Initialize an empty, undirected graph called NeighborGraph.
   b. For each instruction in the executable:
      i. If it is not a call instruction, skip it and go to the next instruction until a call instruction is found.
      ii. Set CallerAddress to be the address of the function containing this call instruction.
      iii. Set CalleeAddress to be the address of the destination function indicated by this call instruction.
      iv. Set Distance to be the absolute value of the difference between CallerAddress and CalleeAddress.
      v. If Distance is less than the defined threshold PROXIMITY:
         1. If either the CallerAddress or CalleeAddress nodes are not present in NeighborGraph already, add CallerAddress and/or CalleeAddress nodes to NeighborGraph.
         2. Create an undirected edge between CallerAddress and CalleeAddress nodes in NeighborGraph.
3. Determine the distinct groups of connected nodes, also referred to as "finding connected components."
   a. Create an empty VisitedNode list.
   b. Create an empty FunctionGroups list.
   c. For each node in NeighborGraph:
      i. If node is in the VisitedNode list, skip it and go to the next node.
      ii. Create an empty CurrentGroup list.
      iii. Perform a graph traversal (e.g., DFS) of NeighborGraph, starting from the current node. Add each node encountered to the CurrentGroup and VisitedNode lists.
      iv. Append CurrentGroup to the FunctionGroups list.
4. The final FunctionGroups result is a list of groups of functions, where each group corresponds to a distinct set of related functions.

The process described in this section can be applied to recover various kinds of information about the executable.

1.2 Recovering Linker Object Function Boundaries

Linker object boundaries for functions (and thus those of the corresponding source code files) are recovered in some embodiments, using the process described in section 1.1 with the following example refinements.

For this use (i.e., recovering linker object boundaries for functions), PROXIMITY should be relatively low compared to the average distance between callers and callees in the callgraph. This is because linker objects are the smallest unit for the linker, so the caller and callee are likely to be quite close if they indeed share the same linker object. However, PROXIMITY must not be so large that callers are falsely grouped with callees that are actually in separate linker objects.

In one embodiment, PROXIMITY is set to 0 (caller and callee are adjacent). In another, PROXIMITY is set to allow one intervening function between caller and callee. As PROXIMITY gets bigger, the chance of falsely merging two adjacent linker objects increases, due to a tradeoff of under versus overapproximation.

In another embodiment, a set of call instructions is already available at step 2.b. For example, the call instructions may have been identified previously by a disassembler. In this case, instead of enumerating all call instructions, they can be processed by the loop in step 2.b. in order of increasing distance and the loop can be terminated at step 2.b.v. once a distance greater than or equal to the PROXIMITY threshold is found. In one embodiment, the ordering is performed by sorting the set of call distances before step 2.b. In another, it is performed by inserting all distances into a data structure that orders them, such as a binary heap.

1.3 Recovering Static Library Function Boundaries

Static library boundaries for functions are recovered, in some embodiments, using the same process described in section 1.1 with the following example refinements.

Static libraries are groups of linker objects. The linker object boundaries first are recovered, by a process such as the one in section 1.2. Once the approximate set of linker objects is recovered, static library boundaries can be assigned to them. The unit of processing is linker objects (not functions) and linker objects are related to each other by the set of calls between functions they contain.

Figure 9:
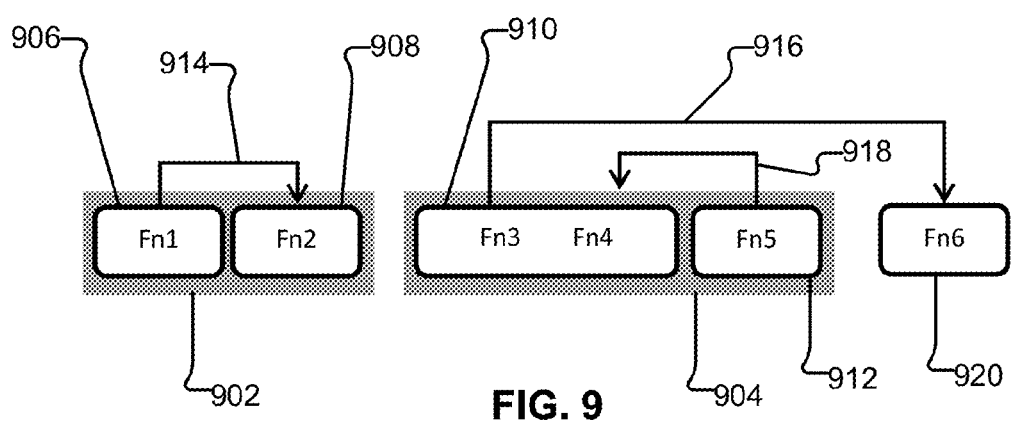
FIG. 9 illustrates static libraries and the linker objects and functions they contain.

FIG. 9 illustrates static libraries (902 and 904) and the linker objects and functions they contain (906-912). Arrows (914-918) indicate calls between functions. The linker object that contains Fn3 and Fn4 (910) is part of the same library as the linker object that contains Fn5 (912). The linker object that contains Fn6 (920) is not in a static library.

An example process for recovering static library boundaries is as follows:

1. Set PROXIMITY to 0 (the linker objects associated with caller and callee are adjacent).
2. Take the list of linker objects generated by a process such as in section 1.2 and the disassembled executable.
3. Apply a process such as is described in section 1.2 with the following modifications:
   a. When comparing the distance between functions, calculate the distance between the caller and callee's linker objects (collection of functions) instead of the functions themselves.
   b. When adding a node to NeighborGraph, add the appropriate linker object instead of the caller and callee functions it contains.
4. The resulting groups of linker objects correspond to static libraries.

1.4 Function Scope or Visibility

Once the approximate set of linker objects has been determined by a process such as described in section 1.2, function scope information can also be recovered. This same process can be applied at both the linker object and static library level.

An example process is as follows:

1. Recover the approximate set of linker objects such as in section 1.2.
2. For each function in the executable:
   a. Set FunctionAddress to be the address of this function (i.e., a unique ID).
   b. Set Scope to be "static" (aka "local").
   c. For each caller of FunctionAddress:
      i. Set CalleeObject to be the linker object of the callee function being analyzed.
      ii. Set CallerObject to be the linker object of the caller function.
      iii. If CallerObject is not the same as CalleeObject, set Scope to be "global."
   d. Output FunctionAddress and Scope.

The final set of all functions and their scope gives an approximation of scope in the original source code. It may be an underapproximation—some global functions that are only called from the same linker object may be mistakenly marked as static. However, if a function is marked global and the linker object boundaries were correctly determined, it truly is global since this is the only way two functions in separate linker objects could call the function is if it is global.

When applying this process to determine function visibility in static libraries, in this example, static libraries are the unit of abstraction. That is, the process looks up the containing static library in portions 2.c.i and 2.c.ii (above) instead of the containing linker objects. Also, note that "local" in this sense only means it is only referenced by functions in the same library. In the C family of programming languages, library boundaries are not recognized (only linker objects) and thus this encapsulation is only a programming convention, not enforced at the linker level.

1.5 Data Scope or Visibility

Once the approximate set of linker objects has been determined by a process such as described in section 1.2, data scope information can also be recovered. This same process can be applied at both the linker object and static library level.

An example process is as follows:

1. Recover the approximate set of linker objects such as in section 1.2.
2. For each data item in the executable:
   a. Set DataAddress to be the address of this data item (i.e., a unique ID).
   b. Set Scope to be "static" (aka "local").
   c. Set FirstObject to be the linker object containing the first function that references DataAddress.
   d. For each other function that references DataAddress:
      i. Set ReferenceObject to be the linker object of this function.
      ii. If FirstObject is not the same as ReferenceObject, set Scope to be "global."
   e. Output DataAddress and Scope The final set of all data items and their scope gives an approximation of scope in the original source code. It may be an underapproximation—some global data that are only referenced from the same linker object may be mistakenly marked as static. However, if a data item is marked global, it truly is since the only way two functions in separate linker objects could access the data is if it is global.

When applying this process to determine data visibility in static libraries, static libraries are the unit of abstraction. That is, the process looks up the containing static library in steps 2.c and 2.d.i (above) instead of the containing linker objects. Also, note that "local" in this sense only means it is only referenced by functions in the same library. In the C family of programming languages, library boundaries are not recognized (only linker objects) and thus this encapsulation is only a programming convention, not enforced at the linker level.

1.6 Recovering Data Boundaries for Linker Objects or Static Libraries

Once function groups have been created, such as in section 1.2, boundaries between the data items they reference and contain can also be recovered. This same process can be applied at both the linker object and static library level. For static libraries, linker objects are the unit of abstraction as in section 1.3.

Data is referenced by instruction reads and writes. Data referenced from functions in the same linker object or static library is likely to be contained in that same unit. Also, the relative order of data items as present in the original source code is maintained by the linker, as with functions. These two constraints can be applied in order to identify which linker objects define which data items.

Figure 10:
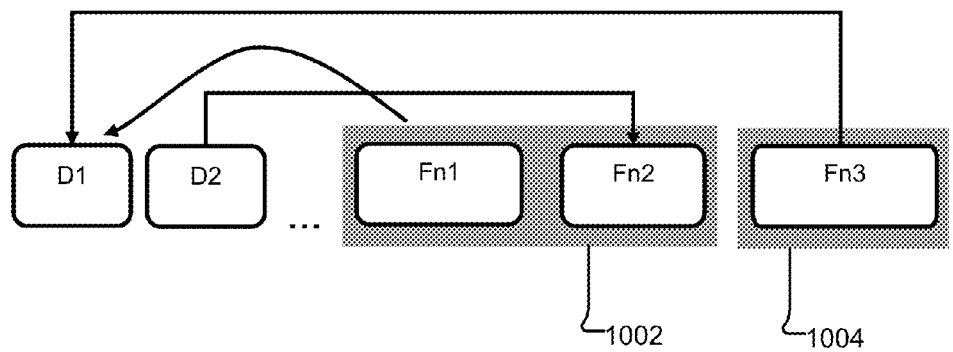
FIG. 10 illustrates examples of data references from various functions.

FIG. 10 illustrates data references from various functions. Linker object boundaries are shown in gray (1002, 1004). Fn1 and Fn3 write to D1. Fn2 reads from D2. Since Fn1 and Fn3 are in different linker objects, D1 is global. Since D2 is only referenced by Fn2, it is defined in the same linker object and is likely static. Since D2's address comes after D1 and D2 is static to Fn2, D1 is defined in the same linker object as Fn1 and Fn2.

An example of this process is as follows:
1. Recover the linker objects (e.g., section 1.2) and optionally, static library boundaries (e.g., section 1.3).
2. Recover the scope of each data item, using the process described in section 2.5.
3. Identify all unique data items by their referencing function(s) in each unit (linker object or static library). Each variable may have multiple references from separate functions, either within or from another linker object or static library.
  a. Create an empty lookup table called DataFunctionTable.
  b. For each linker object, ordered by address:
    i. For each function in the linker object, ordered by address:
      1. For each instruction within that function that reads/writes a data item, ordered by address:
        a. Lookup the data item from the table via its address.
        b. If the data item is not present in the table:
          i. Add its address to the table.
          ii. Associate that address with a new empty list.
        c. Set ReferenceObject to be the linker object containing this function.
        d. Append the ReferenceObject to the data item's list.
  c. The result is an ordered list of data items, each containing an ordered list of linker objects. Order is in terms of ascending address.
4. Set DataAddresses to be an empty list.
5. Set ObjectSet to be an empty set.
6. For each data address DataFunctionTable:
  a. Set Scope to be the data item's scope, using the information recovered in step 2.
  b. If Scope is "static," skip this address and go back to the start of the loop.
  c. Otherwise, Scope is "global." Break out of this loop and process the remainder of the list as in step 7, below.
7. For each data address in the rest of DataFunctionTable:
  a. Set Scope to be the data item's scope, using the information recovered in step 2.
  b. Set ObjectList to be the list of linker objects that reference this data item, retrieved from DataFunctionTable.
  c. Calculate the union of ObjectList and ObjectSet and store in ObjectSet.
  d. If Scope is "static":
    i. Output the set of (DataAddresses, ObjectSet).
    ii. Set DataAddresses to be an empty list.
    iii. Set ObjectSet to be an empty set.
  e. Otherwise, if Scope is "global":
    i. Append this data address to the DataAddresses list.
8. If DataAddresses is not empty, output the set of (DataAddresses, ObjectSet).

The result is a list of (DataAddresses, ObjectSet) values. This gives the potential linker objects that could contain each of the listed data items. In this example, only one linker object actually contains the given data, but the exact one cannot always be uniquely determined. Even if it cannot be determined, the set of potential containing objects can be accurately determined.

1.7 Recovering Source Code Layout and Linker Command Line Order

Once the approximate set of linker objects has been determined by a process such as in section 1.2, their relationships to each other can be analyzed. Examples of the data that can be revealed include the following:

Number of source code files: Count the number of recovered linker objects. This will show approximately how many files the original source code included.

Linker object order: Arrange the recovered linker objects in increasing address order. This corresponds to the order of linker objects specified to the compiler and/or linker, either on the command line or in a project build configuration file.

Relative size of source code files: Assign each linker object a ratio, based on its size versus a reference size. This corresponds to the approximate relation among sizes in the input source code files.

In one embodiment, the reference file can be the smallest of the recovered linker objects. In another embodiment, it can be the largest. In another embodiment, it is the sum, average, or median of their sizes.

In one embodiment, the assigned size is the number of functions and/or data in each linker object. In another embodiment, it is the sizes in bytes of the recovered linker object, which can be measured by the difference between its start and end addresses.

All of the above can be applied to static libraries as well: determining the number of them, the order they were specified to the compiler/linker, and their relative sizes. This can be done by applying the same methods to the set of recovered static libraries instead of the set of linker objects.

1.8 Functions of an API

An API is a programming interface or contract with the rest of the program. Callers pass in defined parameters and the functions that constitute the API perform defined behavior and return the proper results.

With static linking, global functions and data constitute a minimal sort of API. Because the same programmer usually implements all of them, they are usually closely-coupled. Static data and functions hide implementation details from functions outside their linker object.

Another sort of API is usually defined by a static library. The author of the library documents functions and data for callers and packages linker objects up into a single package. Because static libraries are often, (but not always) distributed separately and linked with diverse containing programs, they tend to have a more clearly-defined boundary from the caller's code.

Several elements tend to distinguish API functions from internal functions:
1. Must have global scope.
2. Distance from each calling function is often very large.
3. Often has comparatively many calling functions (incoming edges in callgraph).

Based on this determination, the following is an example of a process that can be applied to recover a list of functions that are part of an API:
1. Set PROXIMITY to a large value compared to the average distance between caller/callee pairs in this executable.
2. Recover the linker objects (e.g., section 1.2).
3. Recover the scope of each function, using a process such as in section 1.4.

4. Create an empty CandidateFunctions list.
5. For each function in the executable:
  a. Set Scope to be the function's scope, using the information recovered in 3.
  b. If Scope is "static," skip this function and go back to the start of the loop.
  c. Set DistanceSum to be the sum of all caller/callee distances of functions that call this one.
  d. Append the set of (Function, DistanceSum) to CandidateFunctions.
6. Order CandidateFunctions by decreasing order of DistanceSum values.
7. For each function in CandidateFunctions:
  a. If the DistanceSum for this function is less than PROXIMITY, break out of this loop.
  b. Otherwise, output the set of (Function, DistanceSum).
8. The final result is a list of sets of (Function, DistanceSum) that are far enough that they are likely to be API functions.

The PROXIMITY value is large enough that it separates actual API calls from local functions that just happen to be farther away, due to linking order. Since the distances of all the incoming edges is summed, this helps distinguish a function with a single caller that just happens to be far away from one that has many incoming edges that accumulate to a large DistanceSum.

2.0 ADDITIONAL EMBODIMENTS

The following are various embodiments which build on the boundary recovery analysis techniques described above.

2.1 Various Identifiers for Functions and/or Data Items

Functions and data items (collectively, "objects") can be uniquely identified in various ways. One way is to use the starting memory address or file offset of the object. Another way is to use the combination of start and end addresses or start and end file offsets. Another is to use a name, if it is known. Another way is to hash or checksum the contents of the object as its identifier. For example, the bytes or instructions that make up a function could be transformed in this way. Another way is to order the objects by their memory address or file offset and apply a set of labels sequentially. For example, a counter or index can be applied to each object in the sequence. In this scenario, it is not important how labels are assigned to objects, only that they be unique.

2.2 Caller Address Normalization

The address of the call instructions may be anywhere within a function and there may be multiple calls to the same callee. If the distance was calculated from the caller instruction address, callers earlier in a function would be farther away from their callees than later call instructions in the same function.

In some embodiments, this is addressed by normalizing all caller addresses to be the start address of the containing function. For example, if calls are made from addresses 1020 and 1030 within a function that starts at address 1000, both calls can be normalized to a caller address of 1000. In other embodiments, multiple calls from a given function are collapsed to the same callee into a single call. For example, if both of the above calls from function at address 1000 were to a function at address 2000, this could be recorded as a single edge instead of multiple redundant edges. In both cases, this does not hamper analysis since operations are occurring at the callgraph (function) level.

2.3 Function Address Distance Calculation

Functions can have both a start and end address. A large function may seem farther away from its callee than a smaller one, even though they are adjacent in both cases. In some embodiments, to improve this behavior, the following comparison function is used, which calculates the closest distance between two functions. The two functions' starting addresses are start1 and start2 and ending addresses are end1 and end2, respectively.

if start2>start1:

$$delta = start2 - end1$$

else:

$$delta = start1 - end2$$

Since functions are composed of a series of independent basic blocks, any number of blocks for a function can be intermingled with blocks from another function. Usually this occurs for only a single block, such as when a compiler reuses a common exit or error handling block for multiple functions. For functions that exhibit this pattern, the end address for one of them can be chosen as the last block before the shared block.

For example, consider two functions at addresses 1000 and 2000 that share an exit block at address 2500. Both functions end with that block, although the function at address 1000 has to jump over the function at 2000 to get to address 2500. In one embodiment, this block will not be assigned to either function. The first function's end address would thus be 1999 and the other's would be 2499. In another embodiment, the block at address 2500 would be considered part of the second function but not the first.

2.4 Function or Data Item Distance as Number of Intervening Functions/Data Items Function distances can be calculated by the number of intervening functions, instead of pure address distance. For example, if function A and C have no function between them in the address, their distance is 0. If there is one function between them (e.g., function B), then their distance is 1.

One way to calculate the number of intervening functions is to assign each function an index value. This can be done by listing the functions sequentially in order of increasing or decreasing memory address and assigning each item the value of a counter. The number of intervening functions can be obtained by the absolute value of the difference of two index values and then minus 1. For example, if the two functions being considered are indices 5 and 7, the number of intervening functions is 1. The same process can be applied to data items.

2.5 Library Distance Via Intervening Linker Objects

The process of 2.4 above can also be used at a higher level of abstraction. Given that the set of linker objects is known or has been approximated, the distance between linker objects can be calculated as the number of intervening linker objects (groups of functions). As above, each linker object could be assigned an index and the difference between indices would be the distance between linker objects.

2.6 Ignore Calls from Functions to Themselves

Since functions can call themselves (aka recursion), the initial processing of the disassembly will occasionally encounter a CallerAddress and CalleeAddress that are identical. Such calls can be ignored if it is desired to identify the relationship between different elements of a program. However, if it is desired to identify recursive functions, this is one example way to do so.

2.7 Conflict Resolution in the Callgraph

When using the process of section 1.2, a function may have multiple caller distances that are below the defined PROXIMITY level. If the function is added to both groups of callers, this may be incorrect and result in joining disparate groups of functions via this "bridge" function, even though it is actually a member of only one of the groups. When presented with this kind of conflict, the following method is an example of a way to resolve it:

1. Take the closest caller first. Even though multiple callers satisfy the PROXIMITY bound, the closest one is usually most likely to be related to this function. If that fails to identify a unique caller, use the following step as a tie-breaker.

2. Take a forward edge over a backward edge. In most programs, functions tend to call forward to functions within the same linker object. That is, the address of the callee will be greater than that of the caller. Backwards calls are rarer and might indicate a call across linker object boundaries.

2.8 Iteratively Refine the Result

The process of section 1.1 groups functions as per the original linker object boundaries. However, the result can be an underapproximation when PROXIMITY is very low, as is suggested in section 1.2. While the boundaries may be accurate, functions may be left out that are neighbors but still farther apart than the given PROXIMITY level. In some embodiments, instead of just performing a single pass with a single PROXIMITY value, multiple passes are performed to iteratively improve the result. In some embodiments, the method of section 1.1 as applied in section 1.2 is modified as follows:

1. Set PROXIMITY to 0 as in section 1.2.
2. Perform step 2 of section 1.1 to get an initial result for NeighborGraph.
3. Set RemainingPairs to be the list of sets of (CallerAddress, CalleeAddress, Distance) for all function pairs that were not yet assigned a group (i.e., not in yet added to NeighborGraph).
4. Increase PROXIMITY to a higher bound, but not so high that false positives occur. In one embodiment, this is a distance of 200.
5. Repeat the following steps:
    a. For each (CallerAddress, CalleeAddress, Distance) in RemainingPairs:
        i. If CalleeAddress is not in NeighborGraph, skip this function pair and go on to the next.
        ii. If Distance is less than the defined threshold PROXIMITY:
            1. If either the CallerAddress or CalleeAddress nodes are not present in NeighborGraph already, add CallerAddress and/or CalleeAddress nodes to NeighborGraph.
            2. Create an undirected edge between CallerAddress and CalleeAddress nodes in NeighborGraph.
            3. Remove (CallerAddress, CalleeAddress, Distance) from RemainingPairs.
    b. If no new function pairs were added to NeighborGraph in this iteration or RemainingPairs is empty, break out of this loop.
6. Continue with step 3 of section 1.1 to return the final result.

This process takes advantage of the fact that a function is more likely to be in the same linker object as its caller than some arbitrary other function, even though the latter may happen to have a nearby address. By starting with a lower bound and then increasing it on subsequent passes, the set of possible candidate linker objects is reduced for later assignments since many functions should already be assigned to a FunctionGroup. This reduces the risk of incorrect assignments even though the new PROXIMITY bound is higher than in the first pass.

In another embodiment, the callgraph traversal can be performed top-down instead of bottom-up. This process starts at the top-level callers and repeatedly finds callees until they are too far from each other. In particular, step 5.a.i above is modified to check for the CallerAddress from the RemainingPairs set being in NeighborGraph instead of CalleeAddress.

In another embodiment, the PROXIMITY level is continually increased on subsequent passes instead of just once. This increase happens in step 5.b above, instead of breaking out of the loop. Once PROXIMITY reaches some maximum value and no new function pairs were discovered, step 5.b terminates the loop. In one embodiment, the step increase is 50 and the maximum value is 200.

2.9 Store Minimum and Maximum Address for Each Set

When using the process of section 1.2 or 1.3, a set of minimum and maximum addresses can be used to define the boundaries of a linker object or static library. Since the linker tends to keep contiguous functions and linker objects adjacent to each other and in the same order, space the memory region between functions or linker objects can be is likely part of the same group.

Linker objects can be represented as an interval of functions, and static libraries as an interval of linker objects. Any intervening functions or linker objects are almost certainly a member of the group of preceding and following elements, if both of those surrounding elements are in the same group.

2.10 Sum or Average the Weights of Edges

While program structure is one factor in determining distances between linker objects, there is also a factor of natural variance in layout. For example, one library function may happen to be adjacent to one of its callers, even though the other callers are much farther away. API functions often have many callers and exhibit this pattern.

One way to avoid adding that kind of accidental neighbor to the wrong linker object is for the score calculated in step 2.b.iv of the process in section 1.1 to be specified as the sum or average of all distances from callers. This tends to increase the differences between the separate distributions of distances that mark the boundaries of linker objects and static libraries and reduce the rate of false joins.

2.11 Process Leaf Functions and Those with Fewer Callers First

In the process of section 1.1, each caller/callee function pair is processed in the order that the callees appear in the program and the distances between them are checked. Leaf functions (those with no callees) are more often located in the same linker objects as their caller than arbitrary pairs. By identifying leaf functions and processing them first, a better initial approximation can be obtained for the set of linker objects, avoiding false joins. In other words, the function pairs are processed bottom-up in terms of the callgraph, starting from the leaf functions. This is a variant on the method described in section 2.8, where the initial copy of NeighborGraph created in step 2 is derived only from leaf functions instead of by all function pairs with distance 0.

2.12 Generate Optimal PROXIMITY Values Based on the Program Itself

Each program will have a different distribution of distances. A histogram breaks up a set of values into intervals and then counts the number of occurrences of the values that fall in each interval. While nearly all programs have distinct peaks in their histogram, corresponding to the boundaries of linker objects and static libraries, there is usually some overlap between these different distributions. This occurs due to natural variation in function size, linker object order specified by the programmer, etc. Instead of using a single value for the PROXIMITY parameter, in some embodiments, a given program's histogram is analyzed in order to choose it. One method for doing this is as follows:

1. Create a histogram of all caller/callee distances for a given executable, using a fixed number of buckets (e.g., 20).

2. Find the two highest peaks. (See the histogram in FIG. 8 for an example.)

3. Set PROXIMITY to a value halfway between the two peaks. This is a point with minimal crossover between the two distributions.

2.13 Exclude Imported Functions Early

Most executables use external dynamic libraries. The executable lists each library name and the functions it uses from it in its imports section. The functions in the executable call into these dynamic library functions at runtime, and the operating system is responsible for mapping in the dynamic libraries when the executable is loaded.

Since these functions are not part of the main executable, they can be excluded from the region analysis listed above. This can be done with an additional step after disassembly, where calls to imported functions are discarded and only calls to internal functions are analyzed.

Figure 11:
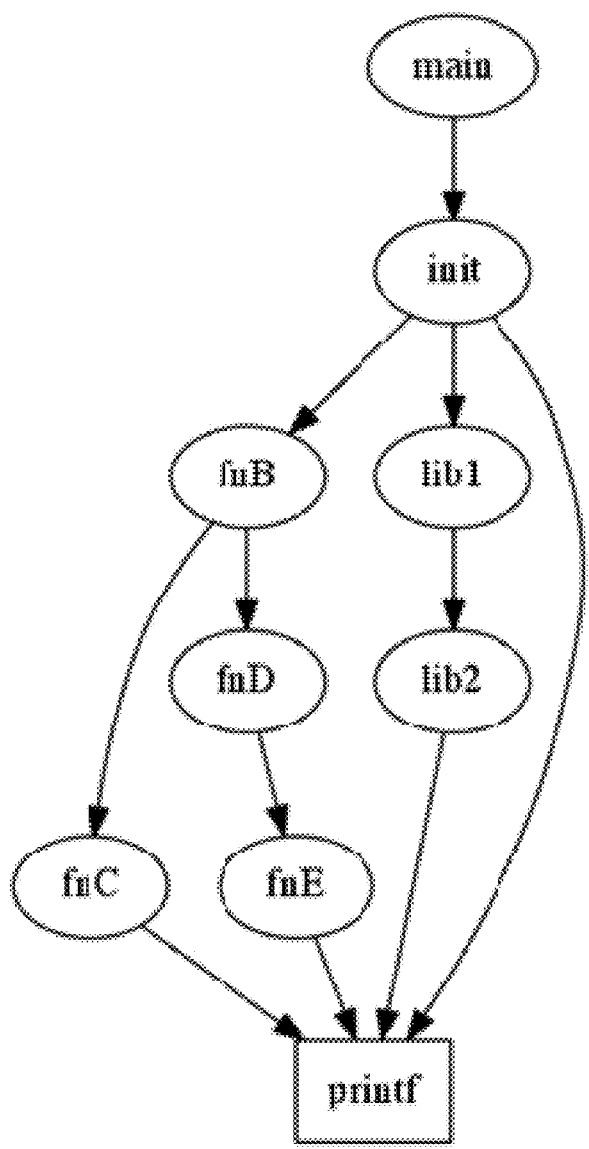
FIG. 11 illustrates an example callgraph to an imported function.

FIG. 11 illustrates an example of a callgraph to an imported function (printf).

2.14 Exclude Known Static Libraries Early

Most compilers include a set of stub functions and common routines as a static library in every executable they build. The stub functions handle things like initializing exception handlers, setting up the environment, etc. One example of this is gcc's crt0.o. The common routines include library functions for copying memory or strings, allocating and freeing memory, etc. One example of this is gcc's libgcc.a.

Since compiler versions change infrequently, the compiler's stub functions and common routines can be detected and excluded from region analysis. One way this can be done is to hash each stub function for each version of popular compilers and then identify these functions before performing additional analysis.

2.15 Handling Obfuscated Input

If the input file is obfuscated, encrypted, or packed, in some embodiments, it is transformed back to its original form prior to processing. Depending on the type of obfuscation used, this process may provide useful information even if the executable is only partially deobfuscated. For example, it may identify approximate boundaries between the packer stub code and its payload, which can be helpful to identify where a control transfer occurs between the packer code and its payload.

2.16 Dynamic Analysis

The techniques described herein can be used in dynamic analysis, in addition to static analysis. In dynamic analysis, the behavior of an executable is recorded as it runs. Instead of statically evaluating the callgraph, it can be discovered as call instructions are executed. In some cases, this will give better code coverage (e.g., if static analysis was not able to find some functions that were called via a computed address) but is often an underapproximation of the full callgraph if not all functions are exercised by the particular inputs given to the program being analyzed.

2.17 Generating a Partial Minimum Spanning Tree

A minimum spanning tree (MST) of a graph is a tree that connects all nodes in an undirected graph, using the minimum-weighted edges as tree edges. In some embodiments, techniques for generating an MST are used in place of step 2.b. of section 1.1.

In some embodiments, a minimum spanning tree is generated in step 2.b. and then links are pruned in decreasing order of distance, terminating when a link less than the PROXIMITY threshold is reached. In another, the links are added in order of increasing distance, terminating when a link greater than or equal to the PROXIMITY threshold is reached.

In yet other embodiments, the callgraph is treated as a directed graph and the optimum minimum branching is generated in place of the minimal spanning tree. An optimum minimum branching is similar to a MST, but with all edges being directed and pointing away from the root node. As above, the links can be pruned by traversing the optimum minimum branching in order of greatest to least distance or by adding them in order of increasing distance, terminating when the PROXIMITY threshold is reached.

2.18 Finding Articulation Nodes

Section 1.8 describes a process for finding functions that constitute an API. In some embodiments, a modified version of depth-first search (DFS), which identifies articulation nodes in a graph, is used. DFS visits every node in a graph, often employing a stack to keep track of the set of vertices to evaluate. If the entire graph is connected, one traversal suffices to reach every node. If not, the traversal must be restarted for each unvisited vertex until all have been visited.

An articulation node is a node that, when removed, disconnects a previously connected graph. For example, if there are multiple edges from the root node to child nodes, removing the root node splits the remainder into at least two separate graphs. Any node only connected to the graph via one edge cannot be an articulation node since removing it cannot affect the connectivity of any other nodes in the graph.

Functions that are part of an API often appear as a choke point, with multiple callers from other modules converging on the few functions that are entry points to a library. These nodes can be identified by using a modified DFS to find such articulation points of the callgraph.

In one embodiment, a brute force method is applied. Each vertex in the graph is deleted in turn and a DFS is performed. If the remaining vertices aren't all reachable, the vertex was an articulation vertex. In another embodiment, a DFS is performed over the graph, keeping track of tree and back edges. The extent to which back edges link parts of the tree to ancestor vertices indicates that the nodes on the tree path are not articulation vertices. After the DFS traversal terminates, the remaining nodes are articulation nodes are the functions that constitute an API.

In an alternate embodiment, the set of edges needed to separate the callgraph into two parts is identified by solving the minimum cut problem. Such a solution identifies these "bridge edges," which are similar in concept to articulation nodes. One example of the process is as follows. 1. Start with a collection of source nodes (those with no callers) and sink nodes (those that make no calls). 2. For each connected source and sink, find the minimum cut, that is, the fewest number of edges whose removal will separate source from sink. The remaining connected components after this cut is made constitute a grouping of functions. Each of the sets of all connected components generated by repeating this for all source/sink pairs constitutes an API.

2.19 Finding Related Items by Clustering

Clustering algorithms assign items to a group, based on the distance between each pair of items. In some embodiments, they are used in conjunction with the techniques described herein to recover function or data boundaries. In one embodiment, hierarchical agglomerative clustering is used. In another, k-means clustering is used.

Since a program has structure, the choice of distance function can be important. In one embodiment, the distance function is the address space distance between caller and callee or infinity if a given function does not call a given callee. In another embodiment, the distance between two functions in the callgraph is the sum of the distance of all caller/callee pairs on the path between them, or, infinity if there is no path between the two functions.

Example Process for Recovering Structure from Binaries

Figure 12:
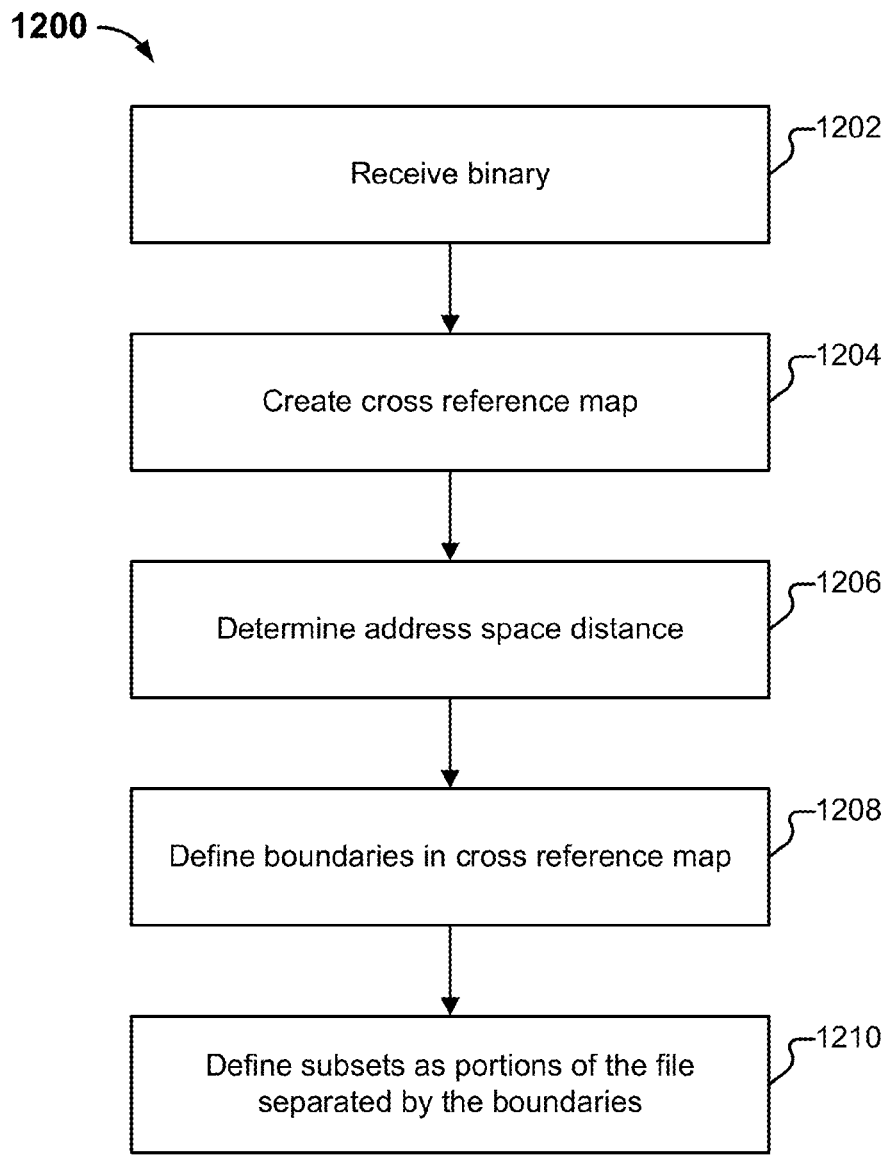
FIG. 12 illustrates an example of a process for recovering structure from binaries.

FIG. 12 illustrates an example of a process for recovering structure from binaries. In some embodiments, process 1200 is performed by analyzer 116. The process begins at 1202 when a binary file having components including a plurality of linker objects is received. As one example, such a binary is received by analyzer 116 in conjunction with an ingestion of an archive. At 1204, a cross reference map of linker objects is created. The functions present in the linker objects are associated based on calls. The data present in the linker objects are associated to instructions that read and/or write to their address in memory. The map can pertain to function calls (e.g., a function call graph) and data references. At 1206, an address space distance is determined for each call. An example of a callgraph whose edges have been labeled with these distances is depicted in FIG. 7. At 1208, boundaries are defined in the cross reference map by defining links based on the address space distance. Finally, at 1210, subsets are defined as portions of the file that are separated by the boundaries.

Software Similarity Searching

As explained above, system 102 is configured to perform searches, such as at the request of a user (e.g., a user of client device 106). Example applications of such searches include detecting plagiarism and license violations, finding code clones, and identifying malware. Various techniques for performing searches, and in particular, software similarity searches of a corpus of software will now be described.

Additional Information Regarding Source Code and Binaries

Software is usually developed in an incremental fashion. At the lowest level, compilers add their own code to the executable to assist it with initialization and shutdown. They also insert small support routines, such as functions to copy or move memory. With languages like C++, the compiler may also insert template code like the Standard Template Library (STL). At the next level up, programmers often use common toolkits and libraries. These may be dynamically linked, in which case the references are to an external library, or statically linked, in which case, they are embedded in the executable itself.

Many factors can introduce variance in the final executable, even if the source code is unchanged. For example, different versions of compilers or optimization settings affect the generated code. Changing build options can add, remove, or modify which parts of the source code are included. Statically linking different versions of libraries also changes those regions of the executable, even if the rest of the generated code is unchanged. Larger variance occurs when compiling code for a different operating system or even a different CPU.

After these factors are taken into account, the remaining changes are usually due to programmer modifications. These include writing new code (or borrowing it from elsewhere), modifying it, or removing it. Depending on the extent of functional changes, the resulting executable may differ widely or only a little.

Additional Information Regarding Features and Terms

Similarity search generally involves finding sets of documents that have some aspects in common. The ingestion process for documents involves identifying and normalizing the contents in order to make them searchable.

One example ingestion process is for text documents. First, a tokenizer splits a text file into individual words called tokens. The tokens are then processed to remove frequent words that have little meaning (e.g., articles like "the") and normalized (e.g., converted to lowercase, hyphenation removed, alternate spellings applied, etc.) The remaining tokens and their associated metadata form the set of terms for a document. Each term's metadata might list, for this document, fields and order of appearance, its frequency, etc.

If the document is structured (e.g., HTML), one way this structure can be captured is by adding field information to term metadata. For example, a term might be found in the document title (versus body text). This field information helps target a later search process. The process of navigating the fields in a structured document is called parsing.

These definitions can be applied to software similarity search as well. Both binaries and source code are structured files. For example, source code has various components such as functions, variable definitions, etc. A tokenizer can be applied to split the source code into tokens (operators, constants, etc.) A parser can be used to identify the structure of the tokens, creating an abstract syntax tree (AST). For example, a parser would show which variables were declared within a function (local scope) or outside (file scope).

As used herein, the terms "Feature" and "Term" have the following meanings with respect to binary/source code embodiments:

Feature: a class of information extracted from binaries or source code that captures some aspect. For example, the total number of functions or all variable names sorted alphabetically are both features. A feature may be applicable only to a given field. For example, a feature of exported function names would be specific to the section of a binary that lists exports.

Term: a concrete instance of a feature extracted from a particular binary or source code file. A complete set of terms should uniquely identify a given file, and subsets should identify commonality between files.

Additional Information Regarding Inverted Indices

One example use of an inverted index is in a search engine. A user's query is submitted as a set of terms, each of which is looked up in the index to find the containing documents. The index section at the end of a book is also an example of a simple inverted index, listing page numbers for each term.

During the ingestion process, each document is added to the index. It is first split into a set of tokens, which are processed to form terms. A term is usually the combination of a token and other information, such as its location within the document. The terms are looked up in the index. If they are not already present from another document, the missing terms are added. Finally, a reference is made between each of the terms and the new document.

When a search is submitted, the index looks up each of the terms. It then creates a list of the containing documents, each with an associated score. One example scoring technique is to rate each document by the number of terms it has in common with the query divided by the total number of terms in each (known as the Jaccard Index). The list of matching documents is then returned, usually in order of descending score.

Additional Information Regarding Exact and Approximate Search

There are two kinds of similarity search: exact and approximate.

Exact search can be very fast and scalable since it can be implemented as a simple table lookup. However, it is subject to what an end user would consider to be false negatives. For example, a program with even small changes usually will not be found by an exact search process. Usually, there are no false positives if implemented properly (e.g., using a hash function not subject to collisions).

Approximate search is usually slower than exact search since it has to allow for differences in the inputs. This slowness comes from the calculations involved in performing an approximate comparison as well as the larger number of pairs of candidate programs in the corpus that have to be considered. These factors are always present to some extent with approximate matching, typically limiting its use to smaller groups of programs than exact search.

Exact and approximate search can be viewed as endpoints on a continuum. For example, approximate search can be implemented as an exact search for small sequences of material from each program (also called "k-grams" or "n-grams"). Since these snippets are the element of matching instead of the entire program, this method allows for some variation while still finding largely-similar programs. Since an exact lookup method, such as a hash table, can be used to find these snippets, this can be faster than other approximate search methods.

However, this increased performance often comes with a cost of increased error rates (false positives or false negatives). False positives occur when an unrelated program happens to share a few snippets with another program. This can happen for a number of reasons, including the snippets being so short that many programs share them. False negatives occur when a related program happens to have been changed in a way that the approximate search scheme is too sensitive to. For example, if the snippets are too long, even small changes at the right locations will cause them to vary, resulting in no match.

One way to do approximate similarity search is to perform clustering or classification on the input programs. Clustering is an unsupervised process whereby programs are assigned to centroids that minimize the distance between members of the cluster. Classification is a supervised process whereby a set of labeled ground truth data is supplied to a learning phase and then unknown programs are assigned a label, based on the results of the learning phase.

After clustering or classification is performed, a similarity search is performed using a given query executable. In the case of clustering, the result is the set of other executables from whichever cluster it is closest to. In the case of classification, the result is the label assigned to the query executable by the classification method.

Both clustering and classification depend on a function that calculates a similarity score for a given pair of programs. The scoring method must satisfy various requirements (e.g., be a metric or distance function). For example, a metric must satisfy the symmetric property, which requires that the similarity of A to B is the same as B to A.

Because similarity for each pair of programs is reduced to a single score, such methods for similarity search provide only a minimal level of detail in the results. For example, such methods often do not identify which regions of a program are similar between pairs, only the approximate amount of commonality or shared features. The particular terms shared by a given pair are not often apparent. For regions of a program that don't share features with other programs, the reason for lack of matching is often unclear as well. It could be due to innocuous changes, such as using a different compiler, or it could be due to actual functional changes made by a programmer.

Additional Information Regarding Containment Search

Basic containment search is related to similarity search, but with a different scoring method. Instead of scoring a pair of documents based on their combined terms, they are scored using whichever document is smaller. The larger document could contain the smaller document, but not vice versa.

One scoring method is to calculate the Jaccard Index as with similarity search but use the number of terms from the smaller document as the denominator instead of the combined total number of terms of the two documents. This method, known as Jaccard Containment, accurately describes the similarity of the entire smaller document to a subset of the larger document.

One problem with using basic containment search with binaries is that the original regions of an executable are not usually delineated. This makes containment search slow, due to the dramatic increase in number of candidate pairs that must be considered since any program can be contained within any larger program, in any number of locations.

3.0 SIMILARITY SEARCH

The following is a description of techniques for performing similarity searches of executable files. As explained above, a file can be characterized by its set of terms. Terms are each an instance of a given feature. Multiple features can be extracted from a given executable in order to accurately capture its implementation.

3.1 Ingestion Process

The following is an example of an ingestion process that can be performed for each executable supplied as input to system 102 in some embodiments. Given a file that comprises executable code and its data, perform the following processing:

1. Validate the executable file. If it is not valid, discard it. The purpose of this portion of the process is to make sure that the input is valid by checking the executable header, section layout, etc. If the file is invalid, there is no need to process it further.

2. For each feature, extract all of the terms from this file. This portion extracts terms from the file for each type of feature. In one embodiment, features are one or more of the following:

Strings: a set of printable strings found in the binary. In one embodiment, a string is a sequence of ASCII characters. In another, it is a Unicode sequence (e.g., UTF-16 or UTF-32). In another, it is a length-counted sequence of ASCII characters (i.e., Pascal strings).

Imports: a set of groups of imported function names, organized by the library name that contains them.

Exports: a set of exported function names. This applies if the executable is a library or symbol information is present.

Instructions: a set of n-grams of the bytes within the code section(s) of the binary. In one embodiment, the value for n is 5, meaning the result is overlapping subsequences that are each 5 bytes long.

3. Load all terms into an inverted index, associating each with the file it came from. Here, the executable's terms are loaded into the index. This allows them to be looked up during a later search process. Each term references one or more executables that contain it. For example, if the feature type is "Strings" and both executable A and B contain the string "hello", then the index entry for "hello" will point to both A and B.

Figure 13:
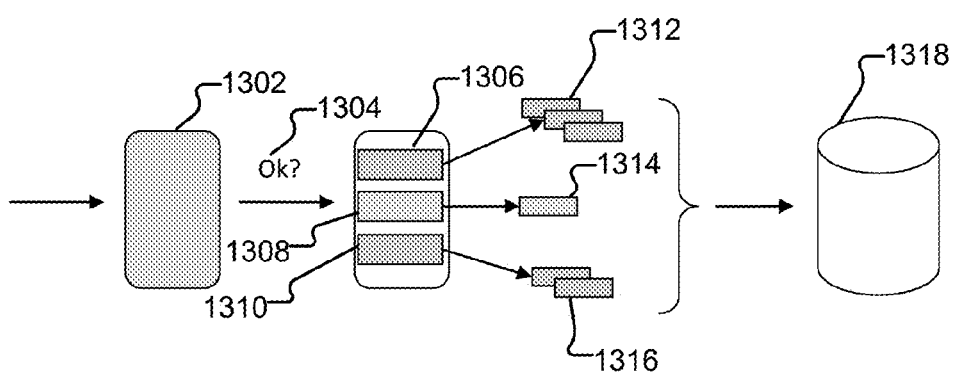
FIG. 13 illustrates an example of ingestion being performed.

FIG. 13 illustrates an example of ingestion being performed. In the example shown, input executable 1302 is validated (1304). For each of three features (1306-1310), various terms (1312-1316, respectively) are extracted. In one embodiment, the features are extracted from output of a disassembler. Features can also be directly from the executable instead of, or in addition to, the output of a disassembler. The terms are loaded into the inverted index (1318), associated with the containing executable. In some embodiments, inverted index 1318 is inverted index 134.

3.2 Query Process

The following is an example of a query process that can be performed when a similarity search is initiated. Search is performed in two phases: a query of the inverted index to get an initial set of candidates and then a refinement step to rule out any candidates that are too dissimilar. This limits the number of pairs of executables processed by the slower refinement step.

Given:
1. A query executable file selected by the user.
2. The process of section 3.1 has been performed for all executables to be searched, including the one selected as the query.
3. Three example thresholds have been defined: NEARLY_IDENTICAL, TOO_DIFFERENT, and MATCH:
   a. NEARLY_IDENTICAL is the score where pairs greater than this level are considered so close that they need not be examined more.
   b. TOO_DIFFERENT is the score where pairs lower than this level are considered so different that it is unlikely any further analysis would be fruitful.
   c. MATCH is the score where pairs greater than this level after any refinement steps are similar enough to be returned as results.

Perform the following process:
1. Take the entire set of terms extracted from the query executable and submit them as a query to the inverted index.
   a. The index looks up the query terms and the files that contain them, scoring the quality of the match based on the selected scoring function (e.g., term frequency multiplied by inverse document frequency or "TF.IDF").
   b. The index returns a list of executable files, in descending order of score.
2. Discard the query executable itself from the results. It should appear as an identical match because it was added to the index during ingestion.
3. Arrange the rest of the results into two categories:
   a. Set NearlyIdentical to be the group of all files whose scores are above the NEARLY_IDENTICAL threshold.
   b. Set MoreWorkNeeded to be the group of all files whose scores are between the NEARLY_IDENTICAL and TOO_DIFFERENT thresholds.
   c. Discard all files whose similarity scores are below the TOO_DIFFERENT threshold. In another embodiment, the inverted index itself has an option for specifying this minimal threshold and performs the filtering itself.
4. For each file in the MoreWorkNeeded group:
   a. Perform a pairwise comparison between this file and the query file's terms, returning a score. This step is described below in section 3.2.1.
   b. Add all files with a score greater than NEARLY_IDENTICAL to the NearlyIdentical group.
   c. Set Match to be the group of all other files with a score greater than MATCH.
   d. Discard all files with a score less than TOO_DIFFERENT.
5. Return the NearlyIdentical and Match groups as the final results. Each file in the group is associated with its final score, as calculated above.
   a. In one embodiment, the files are sorted by decreasing score.
   b. In another embodiment, the NearlyIdentical and Match groups are merged instead of being returned separately.

Figure 14:
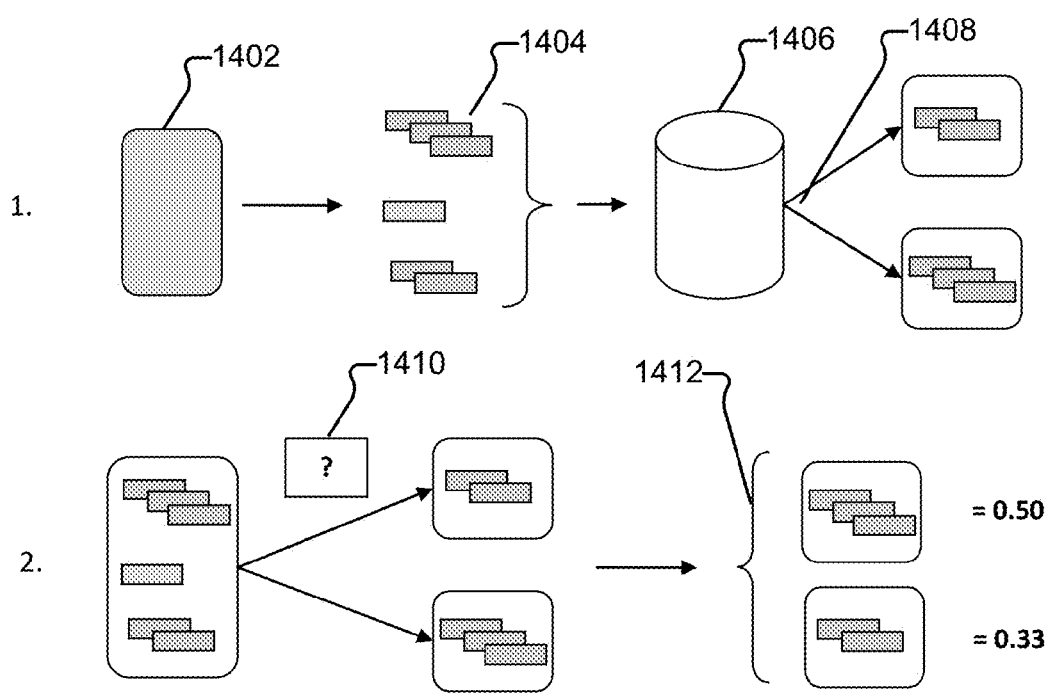
FIG. 14 illustrates an example of a query being performed.

FIG. 14 illustrates an example of a query being performed. The user selects a query executable (1402). Its terms are retrieved (1404) and then supplied as a query to the inverted index (1406). The results (1408) are two programs in the MoreWorkNeeded group. In this example, both are similar enough to the query that more refinement is needed. The query executable and the candidates are analyzed by a pairwise comparison process (1410), resulting in a list of matches and their scores (1412), sorted in descending order.

3.2.1 Example Pairwise Comparison Process

In some embodiments, the pairwise comparison process is performed as follows. Two phases of matching are performed. The first phase uses exact matching to quickly identify and exclude trivial matches. The second phase applies approximate matching to identify corresponding terms while allowing for some variation. As with the process in section 3.2, the goal is to reduce the set of candidates supplied to the slower and more false-positive prone approximate matching method.

The process is performed as follows:
1. Define MAXIMUM_DIFFERENCE to be the level at which two terms are considered too different to match.
2. Create an empty set called MatchingTerms.
3. For each feature:
   a. For each term of that type in the query executable:
      i. Set QueryTerm to be the term.
      ii. Perform an exact search for QueryTerm in the candidate executable. For example, a hash table can be used to look up each term in the candidate executable.
      iii. If QueryTerm was found:
         1. Set Distance to 0.
         2. Add the set of (QueryTerm, QueryTerm, Distance) to MatchingTerms.
         3. Remove QueryTerm from the sets of terms of both executables.
   b. For each term of that type in the query executable remaining after exact search:
      i. Set QueryTerm to be the term.
      ii. Perform an approximate search for QueryTerm in the candidate executable with a given distance function and MAXIMUM_DIFFERENCE bound.
         1. In one embodiment, the approximate search function is an exhaustive search of all terms of the same feature type (i.e., "CandidateTerm").
         2. In another embodiment, the distance function is the string edit distance (also known as Levenshtein distance) between the two terms.
         3. If the calculated distance is greater than MAXIMUM_DIFFERENCE, the result is "not found."

iii. If the term was found:
1. Add the set of (QueryTerm, CandidateTerm, Distance) to MatchingTerms.
2. Remove QueryTerm from the terms of the query executable.
3. Remove CandidateTerm from the terms of the candidate executable.
c. Set QueryUnmatched to be all the remaining terms in the query executable.
d. Set CandidateUnmatched to be all the remaining terms in the candidate executable.
4. Calculate the final score:
a. Set DistanceTotal to be the sum of all distances in elements of MatchingTerms.
b. Set UnmatchedTotal to be the sum of all lengths of terms in the QueryUnmatched and CandidateUnmatched sets.
c. Set AllTermsTotal to be the sum of lengths of all the terms in the original query and candidate executables.
d. Set FinalScore to: 1−((DistanceTotal+UnmatchedTotal)/AllTermsTotal).

Figure 15:
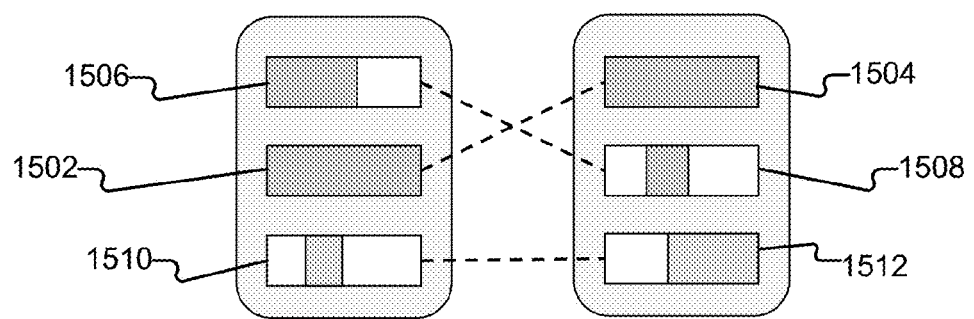
FIG. 15 illustrates an example of a pairwise comparison of two programs.

FIG. 15 illustrates an example of a pairwise comparison of two programs. In the example shown, dotted lines indicate matches between corresponding terms. Boxes 1502 and 1504 are exactly matching terms. Boxes 1506 and 1508, and 1510 and 1512, respectively, are approximate matches of varying degree.

Figure 16:
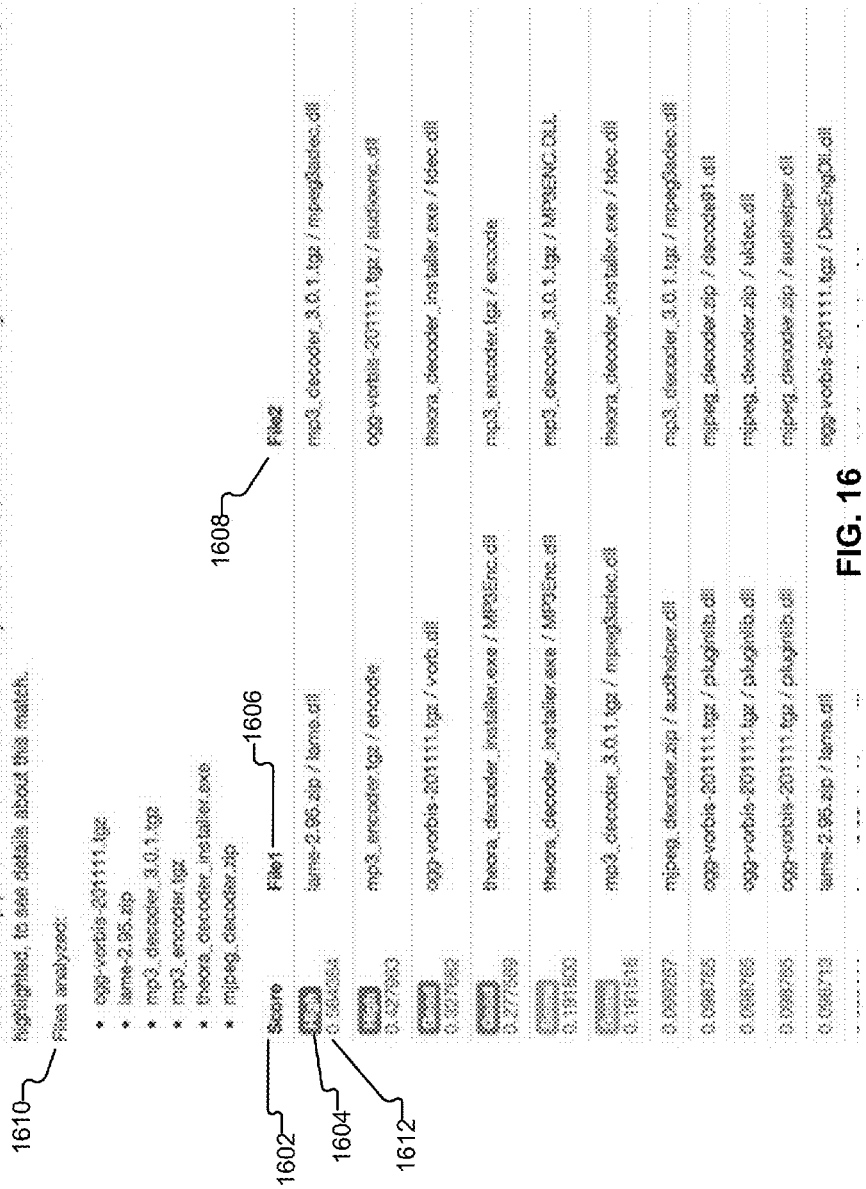
FIG. 16 is an example of a similarity report showing pairs of executables and their scores.

FIG. 16 is an example of a similarity report showing pairs of executables and their scores. The lefthand column (1602) gives the similarity score. Scores are labeled (1604) to highlight those that are significant. The two file entries (1606, 1608) show the files that were compared and the uploaded file (e.g., zip archive) that contained them. A list at the top (1610) summarizes all the files that were compared to generate this report.

If a user (e.g., Alice) were to select one of the pairs of files (e.g., by clicking on score 1612), the pairwise match details will be displayed. FIG. 17 illustrates match details for a single pair of files. Specifically, Alice has clicked on score 1612 and been presented with the interface shown in FIG. 17. The two files that were compared are listed in the title (1702)—lame.dll and mpeg3adec.dll. Two sections of match information are listed: data (1704) and code (1706) matches.

The data section (1704) shows string matches between the two files. The string values are listed, and the special value "(same)" signifies an exact match. The latter strings are approximate matches so both values are listed (e.g., "output.mp3" and "output-test.mp3").

The two bubbles in the score section represent the similarity score and system 102's confidence that a correct match was made between these two features. These are displayed separately because a string might appear multiple times in one or both of the files. Thus, the confidence may be lower that a correct match was made (these are the same items in both files), even though the values are identical. When the user selects one of the bubbles, the underlying numeric score is displayed.

The code section (1706) shows function matches. The names of both functions are shown, or an automatically generated identifier if the name is unknown. The right side shows the longest matching opcode sequence between the two functions, which helps indicate the quality of the match. Like data matches, the two bubbles show similarity and confidence scores separately.

4.0 ADDITIONAL SEARCH EMBODIMENTS

The following section describes various embodiments which build on and/or refine previously described techniques.

4.1 Use BM25 Scoring Methods for the Inverted Index

In some embodiments, the index's scoring function is TF.IDF. In other embodiments, the Okapi BM25 scoring method is used instead. In yet other embodiments, the modified version known as BM25F is used. BM25F takes into account field and position information for terms as well as repeated terms. In software similarity, repeated terms, their positions, and the field they occurred in are all significant aspects of both source code and binaries.

4.2 Use Locality-Sensitive Hashing Instead of an Inverted Index

Locality-sensitive hashing is an approximate matching technique designed to reduce the number of candidate pairs that need to be considered while scaling to large numbers of documents. In some embodiments, locality-sensitive hashing is used in place of the inverted index. The minhashes of the terms of each executable are first calculated, then divided into bands and hashed again. The set of pairs of executables that share a given number of matching bands is returned as the set of matches.

4.3 Multi-Pass Filtering

In some embodiments, various additional filtering passes are added to the query process of section 3.2. This additional filtering helps save processing time and reduces false positives encountered during the later approximate matching phases.

4.3.1 Exact Matching Before Index Query

In one embodiment, a step is added before 1 which performs exact matching of the entire executable. If it is found, there is no need to continue with the index lookup since a completely identical match has been found. One way this exact match can be performed is by comparing each file's cryptographic hash (e.g., MD5, SHA-1, SHA-256, etc.), CRC, or other checksum types. The hashes can be looked up in a hash table to quickly find if there's a match.

4.3.2 Nearly-Identical Matching Before Index Query

In another embodiment, a step is added before 1 which performs a check for nearly-identical executables. The process is as follows:

1. Apply locality-sensitive hashing with a high accept threshold to all executables. In one embodiment, this is a similarity score of 0.95 or higher.
2. If matches are found:
a. Add the results to the NearlyIdentical set.
b. Exclude the matches from the later index query (step 1) by passing the NearlyIdentical set to the inverse index as a filter list.
c. Do not add the terms from this document to the index (step 3 of section 3.1).

The first step can be performed by locality-sensitive hashing of minhashes of each executable's terms. A high threshold is used to exclude all but near duplicate executables.

The second step uses a feature of some inverse indexes that allows the query to include a list of documents to exclude from the search. Since the first step already found a set of near-identical documents, there is no reason to look them up again in the index.

The final step prevents the index from growing bloated by near-duplicate executables.

4.3.3 Clustering and Classification

In another embodiment, a clustering or classification process is added as an additional filtering step. This step can be added to the similarity searching process, or applied at one or more stages of a higher-level process that includes using the similarity searching process. In some embodiments, the step is performed multiple times. For example, groups that have high similarity to each other can be identified out of a set of software that has some minimal similarity to a query executable. An example of this process is as follows:

1. Given a query executable, perform similarity searching.
2. Perform clustering on the results.
3. Return the resulting set of groups to the user.

4.4 Additional Approximate Search Methods.

As a refinement to step 3.b.ii of section 3.2.1, other approximate search methods besides exhaustive search can be applied. Such methods can reduce the number of items that need to be considered in order to find a match by dividing up the search space.

In one embodiment, a KD-tree is used. In another embodiment, a vantage point tree (VPT) is used. In another embodiment, a BK tree is used. All of these schemes involve partitioning the search space based on initial comparisons, reducing the total number of pairwise comparisons in the average case. However, with some queries, it is possible for a search to involve comparing all pairs of terms as before.

Other techniques can be applied to reduce the number of terms that need to be stored for each program. For example, minhashing and winnowing both discard a subset of the terms while attempting to maintain enough information to represent the program accurately.

As a refinement to step 3.b.ii.2, the distance function for approximate search is changed from string edit distance. In one embodiment, the longest common subsequence (LCS) is calculated. In another embodiment, the local alignment of terms is calculated, as in the BLAST algorithm. In another embodiment, bipartite matching by the Hungarian algorithm is applied to calculate the distance between features represented as graphs.

As a refinement to the final step 4 of the process in section 3.2.1, the alignment of terms can also be returned in addition to the score. That is, the sets of exact, partial, and unmatched terms in each program can be returned as well, linked to their corresponding terms in the other program. This provides additional detail to the user in determining which factors went into a given score, as well as helps with digging into what exactly is similar or different in the two programs.

4.5 Combined Source Code and Binary Similarity Search

In various embodiments, system 102 provides the ability to search any combination of both source and binary code since samples may be received in one or more of these formats. In some embodiments, system 102 is configured to extract various features from source or binary code in order to allow them to be compared to each other. The following are four example sets of features that can be extracted from code.

1. Source-only features.
2. Shared features (debug info present).
3. Shared features (no debug info).
4. Binary-only features.

These features are organized by the lowest level representation where they are recoverable. For example, source-only features are only found in the original source code but not lower-level representations (e.g., binaries with or without debug info). Variable names can appear in binaries if the debug information is present or the names are exported by the linker. Binary-only features are low-level and specific to a particular build. For example, a list of x86 opcodes is not present in the source code, although an abstract sequence of operations is.

Figure 18:
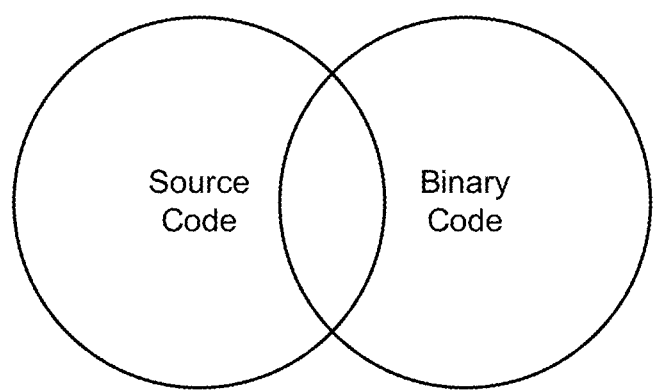
FIG. 18 illustrates an example of overlap between source code and binary features.

FIG. 18 illustrates an example of overlap between source code and binary features. Some features are common to both the source code and binary, and others are exclusive to each form.

An example ingestion process, for use with a combination of source code and binaries is as follows:

1. Extract terms from the existing form of the code (source or binary).
2. For each term, convert it to the appropriate representation for the alternate format. For example, if a string constant is found in source code, it will also be converted to the appropriate binary representation for matching in that domain.
   a. If the term has no representation in the alternate format, skip it and process the next.
3. The final result is a set of terms for both source and binary forms of this code. One will have been directly obtained from the sample itself. The other will have been generated by the above process.

The search process is as follows:

1. Perform the ingestion process as described immediately above.
2. Perform a search for the combination of source and binary terms.

In one embodiment of this conversion process, a sequence of machine-specific instructions from a binary sample is generalized to an intermediate language that captures the essence of the behavior (arithmetic, logical, conditional, floating point, etc.) This converts it to a higher-level form. Conversely, a source code sample is translated into the same intermediate language in a process similar to compilation. This converts it to a lower-level form.

Since the two samples both have the same intermediate representation, the similarity the source code and binary can be determined by comparing their representation in intermediate language form.

Below is a list of various code features and the process for extracting them from source code or binaries, organized by where they are likely to occur.

4.5.1 Source-Only Features

The following features typically only appear in source code and thus do not have a corresponding representation in binaries. Thus, they can often only be used for comparing source code against other source code. All of these features can be extracted with compiler tools like a lexer and parser.

Comments.
Whitespace patterns.
Non-functional or extraneous characters (e.g. extra parentheses).
Pragmas and other compiler directives.
Macro expressions and constant defines.

4.5.2 Shared Features (Debug Info Present)

The following features are present in both source code and binaries, as long as debug information is available for the latter. Thus, they can be used for comparing source code to binaries. In the case of source code, these features can be extracted with compiler tools that generate information like the abstract syntax tree. File names and line numbers are directly available from the source code files. In the case of binaries, this information can be recovered from the debug info (e.g., DWARF or PDB).

Included header file names.
Source code/linker object file names.
Source code/linker object approximate sizes.

Line numbers.
Variable and/or function names (even if not exported).
Data types of variables.
Function parameter types and names.

4.5.3 Shared Features (No Debug Info)

The following features are present in both source code and binaries, even if debug information is not available for the latter. Thus, they can be used for comparing source code to binaries once they are converted into the alternate representation, for example, by the methods described below in this section. In the case of source code, these features can be extracted from its abstract syntax tree, callgraph, and control-flow graph. This info is typically generated by compiler tools. In the case of binaries, this information can be recovered from a disassembler.

Variable and/or function names (only if exported)—this usually applies to executables that are dynamic libraries.
Control-flow graph (structure of basic block nodes within functions and the edges that connect them).
Callgraph (structure of function nodes and the edges that connect them).
The value and type information of static/global data and initialized variables.
String constants.
High-level behavior of functions (abstracted sequence of operations).
Function parameter quantity and approximate size.
Approximate stack layout.

Example techniques for extracting these features and converting them (if applicable) are as follows:

Exported variable and/or function names can be recovered from the exports table of binaries. They can also be recovered from symbol information, if it is included and debug info is not. These names can be recovered from the AST of source code.

The control-flow graph can be recovered from a binary by performing control-flow analysis on the disassembled instructions. Basic blocks are sequences of instructions that have an entry point at the beginning and an exit point at the end. Edges are branches or sequential flow in the case of a conditional branch not taken. It can then be converted into a higher-level representation by reducing the graph and matching common language structures (if/else, while, etc.) This same representation for source code is directly available in the AST.

The callgraph can be recovered from a binary by noting the origin and target of subroutine call instructions. This same representation for source code is directly available in the AST by finding function definitions and calls.

Some value and type information can be recovered from the binary. For example, some instructions specify the size of their memory operands. This size is often the same as the type's size in the source code (e.g., 32-bit integers). However, this is only an approximation of the original type. In source code, the type is directly available in the declarations in the AST.

The high-level behavior of functions can be obtained from binaries as follows:
1. Disassemble the binary.
2. For each basic block in the binary's control-flow graph:
 a. Convert the opcodes into an intermediate language.
 b. Normalize the opcodes by discarding less useful information (e.g., register or memory access).
3. The set of all abstract operations for each basic block is a feature.

In one embodiment, the list of abstract operations for a basic block is ordered as it appeared in the original binary. In another, it is sorted. In another, it is treated as a permutation (no order is kept). The high-level behavior can be obtained from the source code by applying a compiler front-end and translating the intermediate language to the same abstract operations used above.

Function parameter quantity, order, and size can all be obtained from the binary by analyzing the stack behavior of instructions. Parameters and local variables are typically pushed onto the stack before use and popped off when done. Thus, it is common for a function call to involve the caller and/or callee manipulating the stack. These patterns applied by the compiler can be used to determine the parameters to functions. For example, if four 32-bit integers are pushed onto the stack before a call instruction, it is likely these are parameters.

Function parameter information can also be obtained from binaries by applying C++ name demangling or parsing run-time type information (RTTI), if present.

This function parameter information is directly present in the corresponding source code's AST.

4.5.4 Binary-Only Features

The following features usually only appear in binaries, although they can be converted into a shared form as above in 4.5.3. They are useful for searching for other matching binaries built for the same CPU architecture.

Opcodes of native instructions.
Compiler support code and stubs.
Import names and libraries.

4.5.5 Terms

In some embodiments of the ingestion process described in 3.1, the following additional terms are generated from the features described above that have been extracted from source or binary code. In other embodiments, these terms are reduced with minhashing in order to reduce the storage requirement.

4.5.5.1 Source-Only Features
n-grams of each feature listed in section 4.5.1

4.5.5.2 Shared Features
Control-flow graph
 Function Complexity: 3-tuple of number of basic blocks, edges, and call instructions in the control-flow graph of each function
Callgraph
 Above FunctionComplexity value, but adding the FunctionComplexity for each immediate child node of this one (called function), ordered by the order the calls appear in the function.
String constants
 n-grams of strings longer than some bound (12 characters in some embodiments).
 Actual contents of string.
String representations of all the other features listed in section 4.5.3

If debug info is present, these additional terms are also generated:
String representations of all features listed in section 4.5.2

4.5.5.3 Binary-Only Features
n-grams of native opcodes for each basic block in the control-flow graph.
Compiler type and version strings.

4.6 Find Internal Boundaries for Faster Containment Search

Basic containment search, as described above, may not be sufficiently efficient to use with a large corpus because of the growth in number of candidate pairs that have to be considered. This can be unfortunate since containment search is desirable for some binary similarity search applications. For example, it is useful for looking for copyright infringement within a program against a large corpus of libraries where some subset of the libraries could be statically linked into the program. Basic containment search would require comparing every library against the program, which could be an intractable problem if there is a large corpus of libraries.

If the region boundaries of the query program and/or candidate programs are known, each region can be processed as a separate query. That is, instead of comparing all pairs of query and candidate programs as required by containment search, each region can be processed separately as a similarity search. The results for each region are then concatenated into a set of results for the entire program. Since similarity search can be performed with techniques that scale well with corpus size such as described above, this can turn a potentially-intractable problem into a solvable one.

Figure 19:
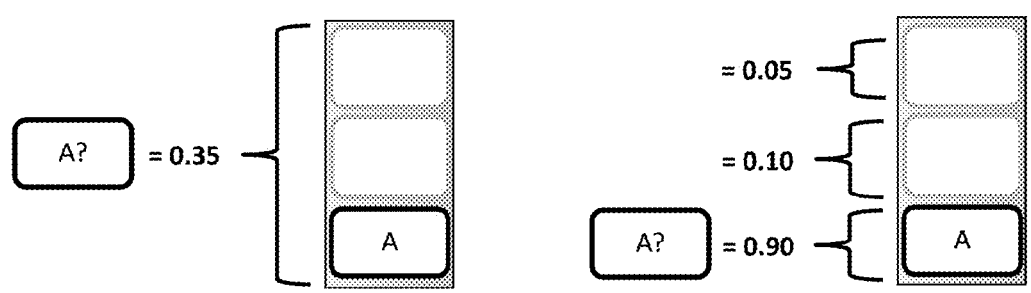
FIG. 19 illustrates an example of containment search using entire files versus regions within files.

FIG. 19 illustrates an example of containment search using entire files versus regions within files. The executable contains three internal objects (linker objects and/or static libraries). One of them is the library "A." In the first case, the similarity query for A is compared to the entire file. The overall score is low because the two other objects are unrelated to A. In the second case, there is a much higher score because the region that contains A is searched separately than the other two regions. To use the latter approach with reasonable performance, the internal boundaries of the executable need to be known.

One way to determine the original boundaries in an executable is via debug information, if it is available. It can be included in the executable (e.g., DWARF format) or an external file (e.g., Microsoft PDB format). This often contains source code filenames and their corresponding addresses in the executable. Thus, each function's original filename can be determined and functions and/or data can be grouped appropriately.

An example of the process is as follows:
1. Obtain the list of all filenames present in a given executable using its debug information.
2. For each filename:
  a. Identify the corresponding functions and/or data within the executable using the associated address.
  b. Extract the terms associated with this group of functions and/or data.
  c. Submit these terms as a similarity search query.
  d. Collect the results of the search and associate them with this filename.
3. Return the list of all results for each corresponding filename in the executable as the similarity results for the entire executable.

In some cases, debug information may not be available for a given executable. In this case, techniques described herein for recovering approximate boundaries can be used instead.

4.7 Filter Results by Origin

Open-source authors provide their source code publicly and encourage other programmers to use it. Also, there are many proprietary programming toolkits (e.g., 3D graphics engines) that are widely incorporated into applications. This code can be directly incorporated (even via cut and paste) or statically linked into the executable.

If two programs are compared, such common libraries will increase their similarity score. This is not always desirable, especially when similarity search is used to find code theft. In some embodiments, an early filtering step is added to find similarity with such common code in order to eliminate it from the main similarity search process. As one example, the similarity search process described above can be modified as follows:
1. Perform a similarity search on each module.
2. If Score is above threshold and Candidate's origin is "public," remove module from the set to use for the rest of the search.

In an alternative embodiment, this approach can be used to identify public code within an executable by modifying step 2 to remove modules that do not have an origin of "public." This approach can then be used to look for open-source license infringement, for example.

4.8 Apply Date Information in Order to Establish Causality

Two programs can be similar for many reasons. For example, they could include the same common boilerplate code. Or, they could be written by the same author at separate times. In many applications, it's important to establish an order to similarity (e.g., in order to determine who plagiarized and who was the original author).

As a refinement to the similarity searches describes above, date information can be applied to each program in the similarity results. This date information can be used to make a determination about which code was the predecessor of the other. For example, if two programs are similar but one has an earlier date attached, it can be assumed that the other program may have been a derivative work.

4.9 Apply License or Usage Constraints to Results

As a refinement to the similarity searches described above, license and/or usage rules can be applied to each program in the similarity results and then validated to see if there are any violations.

A setup process is performed once per license:
1. Determine a set of rights granted by the license. One example is the right to redistribute the software in source form. Another would be the right to do so in binary form.
2. Determine a set of requirements of the license. One example is that the rights granted above are only available to non-commercial users. Another is that the source code of any programs that incorporate the licensed software be made available under the same terms (e.g., GNU Public License or GPL).

The search process is modified as follows:
1. The user identifies a set of licenses that are acceptable for the given executable.
2. A similarity search is performed as usual, using the executable as a query.
3. For each file returned:
  a. If the file's score is below a threshold, it is ignored and processing continues with the next file. In one embodiment, the threshold is 0.60.
  b. Set CandidateLicense to be the license associated with the file.
  c. If CandidateLicense is not in the acceptable license list, output a conflict listing the matching file and CandidateLicense.

In another embodiment, if there is more than one license associated with a candidate file, each license can be compared against the query file's acceptable license list. A warning can be noted if any of them have a conflict.

In another embodiment, the user identifies a set of rights or restrictions they find acceptable, not a list of licenses. These rights or restrictions are validated against the CandidateLicense's rights/requirements determined during the setup process, above.

4.10 Perform Continual Matching

Software similarity search can be used to detect license infringement. This can be done by the user repeatedly submitting their program as a query on a regular basis. This can also be done in other ways (e.g., to avoid repeatedly comparing the same program against existing, unchanged programs). One example is as follows:

1. The user specifies that a given search query is to be performed against new programs as they are ingested by the system.
2. The query is added to the list of queries to be performed on a continual basis.
3. For each program added to the system:
   a. For each registered query:
      i. Calculate the Jaccard Index between the features of the query program and the new program to assess if they are possibly related.
      ii. If the similarity score is below a threshold, this query is not matched and processing continues with the next file. In one embodiment, the threshold is 0.30.
      iii. Perform a pairwise comparison using the method of section 3.2.1 to refine the similarity score.
      iv. If the resulting similarity score is above a threshold, report the match to the user. In one embodiment, the threshold is 0.60.

In one embodiment, programs are automatically added to the system by a web crawler. In another embodiment, users can select whether a given upload should be made available to other users. If so, it is added to the system for others to match against.

Example Process for Performing Similarity Search

Figure 20:
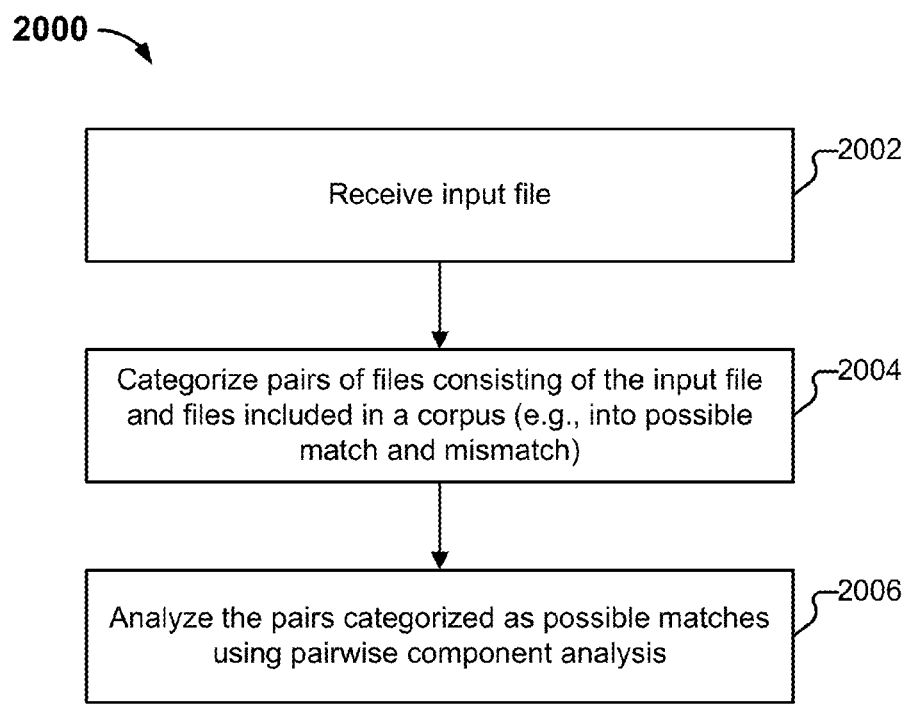
FIG. 20 illustrates an example of a process for performing a software similarity search.

FIG. 20 illustrates an example of a process for performing a software similarity search. In some embodiments, process 2000 is performed by system 102. The process begins at 2002 when an input file is received (e.g., to be used as a search target). The input file can take a variety of forms and can be received in a variety of ways. As one example, the input file can be a ZIP of multiple files uploaded by a user for searching against a corpus. As another example the input file can be a single file uploaded by a user for searching against a corpus. Instead of uploading a file or set of files at the time of a search, a user can also designate a previously uploaded file to be the input file. Further, the user can specify recurring searches (e.g., perform a search using a given input file once a week) or searches in response to events (e.g., perform a search whenever new files are added to a corpus).

At 2004, pairs of files consisting of the input file and files included in a corpus are categorized. In some embodiments, the categorization is binary—files are either "mismatches," or are "possible matches." Other categorizations can also be used. For example, as described above, files can be categorized as "nearly identical," "too different," and "match." In some embodiments, the corpus comprises all files (or binary files) stored in storage 112. In other embodiments, which files will be considered the corpus is also received as input. For example, where storage 112 stores files uploaded by multiple entities (e.g. a user of client 106 and a user of client 108), the corpus can be restricted to just those files uploaded by one entity or the other. Other designations of a corpus can also be used. For example, a user could specify that only files in a particular directory be used as the corpus, could restrict the corpus to files having a particular date range, etc.

Finally, at 2006, pairs categorized as possible matches are analyzed using pairwise component analysis.

Example Applications

The techniques described herein can be used in a variety of applications, examples of which are described in more detail in the following section.

5.1 Flexible Software Licensing

Two example aspects of software licensing that can be improved by using the techniques described herein include invoicing and audit. Invoicing involves determining what components to charge the licensee for. Auditing involves checking shipping products to determine what components they contain and comparing the results to the previously reported component list.

5.1.1 Invoicing

With self-reporting, a licensee obtains software components in source or binary form from the licensor, incorporates them into one or more products, and then notifies the licensor which products contain which software components. The licensor then computes royalties, based on the component list the licensee provides for each licensed product they build.

This can be a time-consuming process for both licensor and licensee. The licensee has to keep detailed records on which licensed technology was added to each product and carefully coordinate between engineering and finance groups to avoid reporting mistakes. The licensor needs to audit for undisclosed product models or underreporting of the use of licensed technology.

One way the techniques described herein can be applied to automate the invoicing process is as follows:

1. Licensor supplies its software components (the "reference set") to system 102 using an ingestion process such as is described in section 3.1. The reference set can be supplied as libraries in binary form.
2. Licensee provides each of its products to licensor. These can be executables.
3. Licensor submits each product as a similarity query (e.g., using the techniques described in section 3.2).
4. The resulting matches from the similarity search are selected from the original list of licensor components and returned as an invoice.

Figure 21:
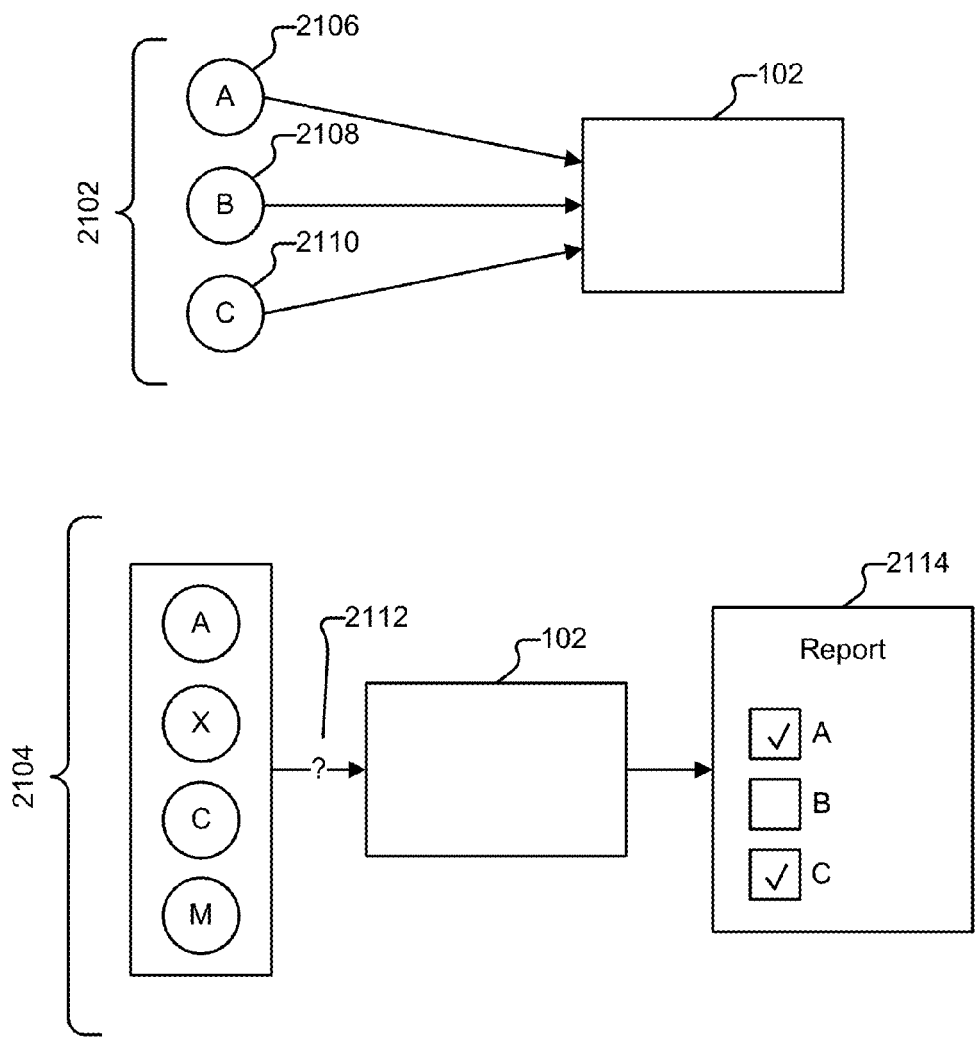
FIG. 21 illustrates an example of software invoicing.

FIG. 21 illustrates an example of software licensing. First (2102), a licensor submits samples of three executables for components A (2106), B (2108), and C (2110) to system 102. The components are imported (e.g., using the ingestion process described in section 3.1) and tagged with their appropriate labels. Then (2104), the licensee submits a product to the licensor. The licensor submits the product as a query (2112) to the system 102, which performs a similarity search such as is described in section 3.2. In the example shown in FIG. 21, two of the submitted product's components match the reference set (components A and C) and two are unrelated to the licensor's code. Finally (2114), an invoice is generated. The invoice includes an indication of which components match.

In some embodiments, the ingestion process does not add the licensee's code to the index. Since the licensor in this example only wishes to match against their reference software components and not licensee products against each other, it may not be desirable to ingest this code. In some embodiments, processing is applied to identify near-duplicate uploads and avoid creating duplicate invoices. This could occur if the licensee submits the same product twice. In some embodiments, the licensor obtains the products itself (e.g., by downloading them from a known location or by purchasing them from a store).

In some embodiments, the reference set is labeled with human-readable names. These names are returned as results in step 4 (above). In other embodiments, machine-readable identifiers are associated with each component in order to allow the licensor to convert the report into a format suitable for ingestion by business logic. In some embodiments, the reference set is used in step 1 to train a classifier. Then, step 3 performs classification of the product instead of submitting it as a similarity query. The resulting label from the classifier is used as the matching component. Example classifiers include naïve Bayes, neural network, support vector machine, decision trees, and random decision forests. In other embodiments, multiple classifiers are trained in order to perform multiple labeling. Each classifier is applied in turn to the product in order to identify more than one included technology. In one embodiment, all the classifiers are the same type. In another, they are different types.

In some embodiments, the product is a desktop or server software executable. In other embodiments, the product is an embedded system and the software being analyzed is its firmware. In yet other embodiments, the product is a mobile app.

Figure 22:
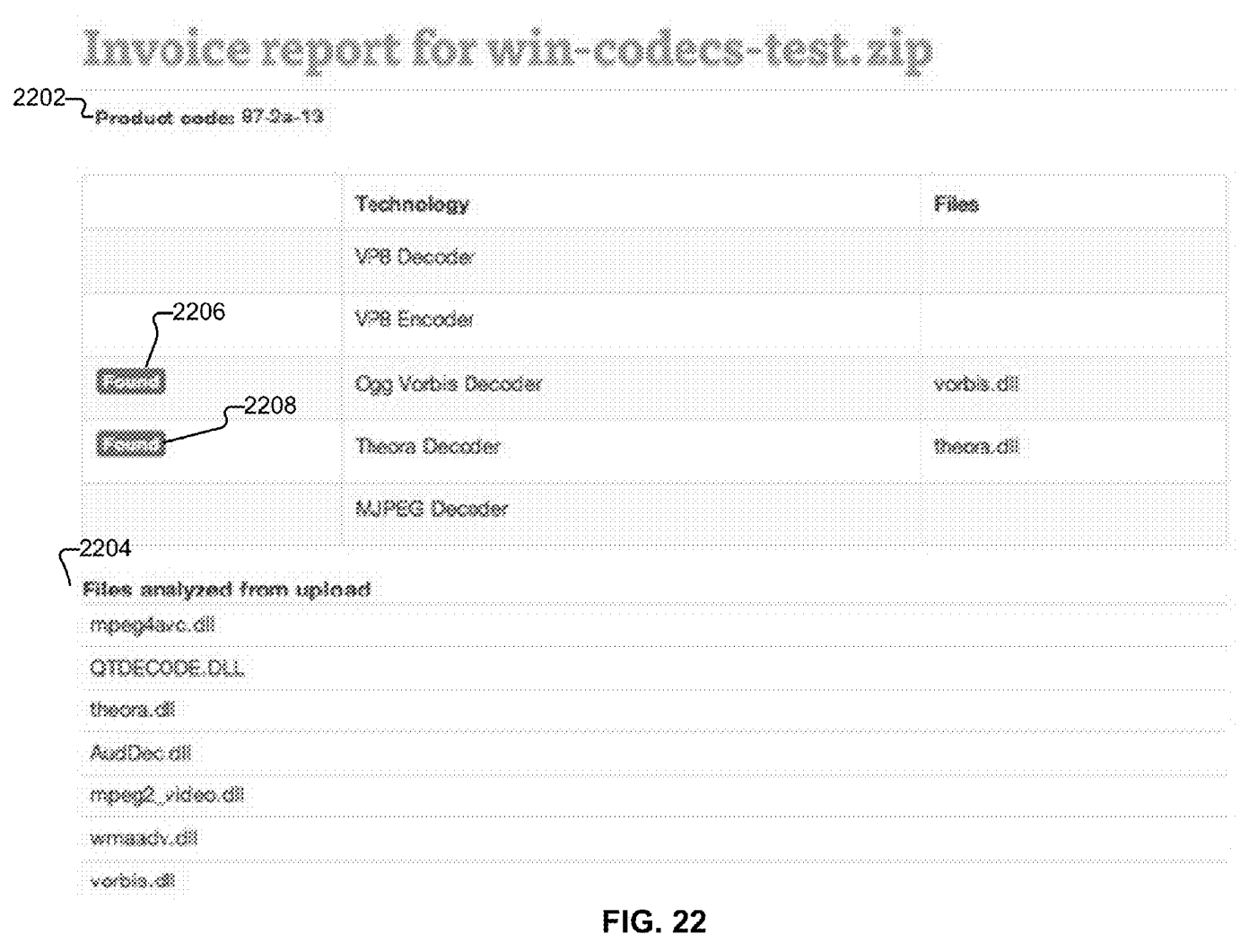

FIG. 22 illustrates an example of an invoice report. In the example report, two components (2206), the Ogg Vorbis and Theora Decoders, were identified in the software product being analyzed ("win-codecs-test.zip"). Other components, such as the VP8 Decoder, were not found in the given product. The binary files that these components were found in are called "vorbis.dll" and "theora.dll," helping to locate the code for future review. A product code is displayed (2202), indicating the licensor's internal identifier for this combination of the two licensed components. A list of all the files in the product that were analyzed is located at the bottom (2204), to confirm that nothing was overlooked.

5.1.2 Audit

Suppose a licensor needs to audit for undisclosed product models or underreporting of use of licensed technology. Licensors could perform periodic audits of the licensee's shipped products manually, testing and/or analyzing the software in order to verify which components were incorporated and comparing the reported component list.

One application of auditing involves checking that licensees are accurately reporting the products they ship. Another application is to retroactively review historical licensed software usage, possibly as an effort to assess lost licensing fees during a period before a licensee signed up.

One example of this process is as follows:

1. The licensor obtains one or more products from the licensee or prospective licensee.

2. For each product, the licensor applies the process described in section 5.1.1 and collects the resulting invoices.

3. The licensor compares the returned invoices against any that were previously generated or supplied by the licensee in self-reporting.

4. The set of mismatching invoices represent usage that needs to have further review.

In some embodiments, the products obtained in step 1 are located via an automated process, such as a web crawler or search engine. This process can continually retrieve new samples and perform this audit process automatically, notifying the licensor only when relevant matches are found. In some embodiments, licensors obtain digital certificates for their products from system 102 (e.g., confirming that only appropriately licensed software is present in a product). The licensor can embed the certificate in the product, allowing the licensee to spot check the licensor's products by verifying the certificate.

Open source software developers can use variants of this audit process for measuring usage of their code (aka "analytics"). If enough users are located, the developer could offer them additional support, offer a commercial version of their software, or take other appropriate actions.

Figure 23:
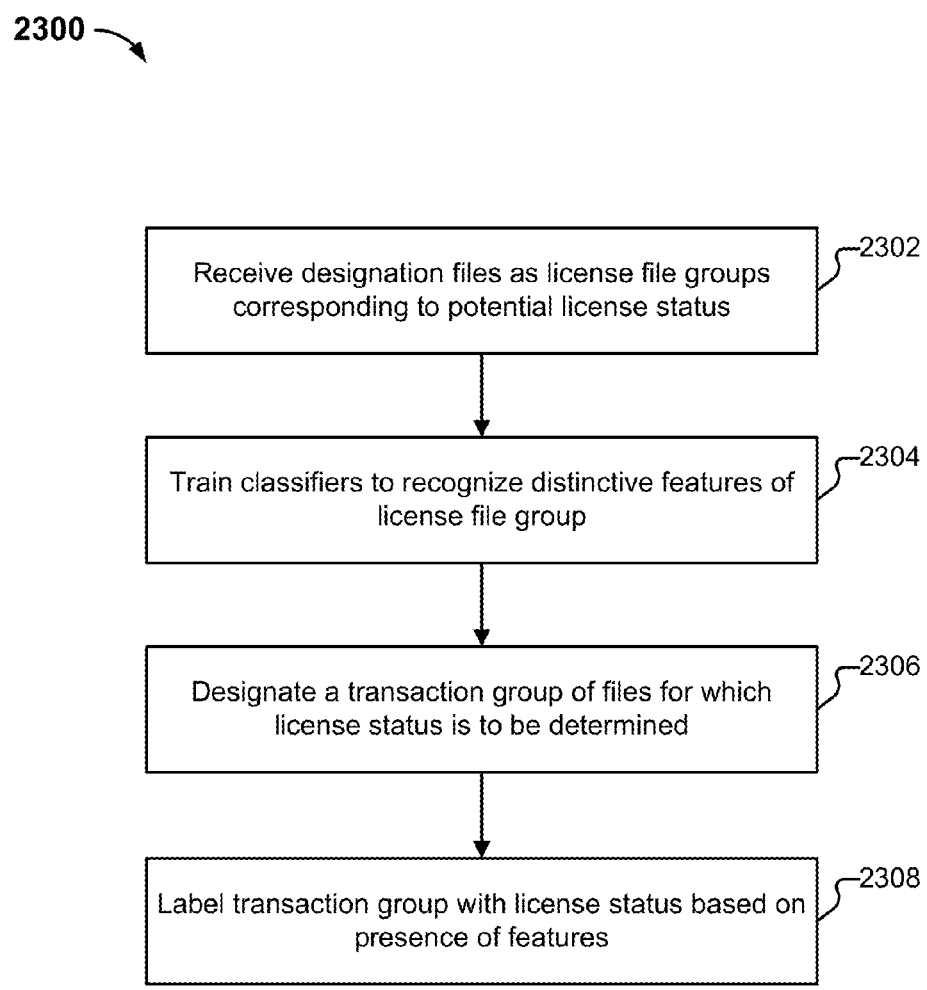
FIG. 23 illustrates an example of a process for enforcing a software license.

FIG. 23 illustrates an example of a process for enforcing a software license. Process 2300 can be used in conjunction with the techniques described herein in a variety of applications, including generating invoices for licensed software and use, and auditing software. The process begins at 2302 when a designation of files as license file groups corresponding to potential license status is received. As one example, a licensor of a bundle of codecs could upload the codecs to system 102 at 2302, and could also designate previously uploaded codecs (e.g., using an interface provided by frontend 104). At 2304, one or more classifiers is trained to recognize distinctive features of the license file group. In some embodiments, the classification/labeling techniques described in section 4.3.3 and/or 5.1.1 are used at 2304. At 2306, a transaction group of files for which a license status is to be determined is designated. As one example, a licensor could upload a licensee's product(s) to system 102 at 2306. As another example, the licensee could provide the product directly to system 102. As yet another example, system 102 could be configured to periodically scan its corpus, crawl one or more websites, or otherwise receive files to evaluate (i.e., designate as a transaction group 2306). Finally, the transaction group is labeled with license status based on the presence in the license group of features associated with the processing performed at 2304. An example of the labeling is shown in report 2114. Other forms of labeling can also be used, including machine-readable labels.

5.2 Software Misuse or Theft Analysis

Software developers often incorporate various third-party libraries in their products. It could be desirable for them to be able to perform an audit of their own usage of such components in order to avoid claims of misuse. Also, there are certain license terms that are not acceptable to some developers (or their employers), and it could be desirable to audit their own products to be sure software encumbered with these terms has not accidentally been added to the product.

The techniques described herein can be applied (e.g., in conjunction with the process in section 4.9) to assess license compliance. An example of this process is as follows:

1. Reference samples are obtained from the original author and imported by the intake system. In some embodiments, commercial software is obtained directly from its licensor. Open-source software can be retrieved from the Internet (e.g., from authoritative sources such as freebsd.org/ports).

2. License rules are extracted from the reference samples. In some embodiments, license rules are at least partially manually specified, or are confirmed/editable by an administrator or user.

3. The software developer submits their product for analysis. The product is used as a query to perform a similarity search in order to find related components.

4. The license rules are checked against the acceptable set (e.g., as described in section 4.9).

In some embodiments, the developer performs this process to check for incorporation of GPL software or other open-source code with unacceptable license terms. In other embodiments, the developer checks to be sure proprietary libraries were not inadvertently included and the final product is only built from open-source code.

5.3 Qualitative Analysis

Companies often review vendor software before purchasing it, and may compare it against competing solutions and score it by various criteria. Since most such software is provided in binary form, it can be desirable to be able to perform some analysis of the components of the software. For example, a company may wish to assess its originality, robustness, and compliance with industry standards. Companies may also wish to evaluate products that are part of a merger and acquisition process. Techniques such as are described in sections 4.7, 4.8, and 4.9 also can be applied to determine the quantity of open-source code used in a product, whether the vendor adhered to third-party licenses, and assess originality based on authorship criteria. The techniques described herein can be applied to assess the similarity of each of the competing products to each other by generating a similarity query for each one. Techniques such as are described in 4.3.3 can be used to cluster the vendor products to assess their similarity to each other.

In the case of software distributors like mobile app stores, binary apps are submitted by the developer to the distributor to review and sell to companies or end users. Repackaging of apps is an important problem for mobile app stores. In this scenario, one developer downloads another's app, edits it to insert new code (e.g., malware) or modifies it to credit the ads it displays to themselves instead of the original author. Or, a developer may make a series of useless apps that are all built from the same codebase with minor variations. In either case, the high similarity of apps amongst developers or amongst a set of apps by the same developer is a good indicator that something is wrong. Techniques described herein, such as the processes described in sections 4.7, 4.8, and 4.9 can be used to identify repackaged apps.

5.4 Depreciation

Depreciation calculations for software products involve measuring how much code has changed over time. Depreciation is part of the asset valuation process, and is typically desired for tax purposes or in the process of an acquisition or sale of assets.

The techniques described herein (e.g., in section 3.3.3) can be applied to various versions of the same software package in order to assess the amount of changes over time. In some embodiments, the number and size of the code and data changes is computed as a percentage relative to the original code and data. This percentage can then be applied to the depreciation calculation to assess the new value of the software.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computing device, comprising:
  at least one processor; and
  at least one memory storing instructions that, when executed by the at least one processor, cause the computing device to:
    receive an input binary file;
    categorize, into a possible match or a mismatch, pairs of binary files consisting of (i) the input binary file, and (ii) a selected binary file included in a corpus of files;
    analyze each of the pairs of binary files classified as a possible match using a pairwise component analysis that involves:
      carrying out a first process that involves exact-matching a first pair of binary files to generate a first comparison value, and
      when the first comparison value satisfies a threshold value of matching:
        preventing the first pair of binary files from being further analyzed,
        carrying out a second process that involves exact-matching a second pair of binary files to generate a second comparison value, and
        when the second comparison value does not satisfy the threshold value of matching:
          carrying out a third process that involves approximate-matching the second pair of binary files to produce a respective similarity score for the second pair of binary files; and
    output the respective similarity score for at least one of the pairs of binary files.

2. The computing device of claim 1, wherein the input binary file is an archive that comprises a plurality of files.

3. The computing device of claim 1, wherein the input binary file is included in an archive that comprises a plurality of files.

4. The computing device of claim 1, wherein, when the first comparison value satisfies the threshold value of matching, the at least one processor further causes the computing device to:
  prevent outputting the respective similarity score for the first pair of binary files.

5. The computing device of claim 1, wherein the at least one processor further causes the computing device to:
  provide, as an output, a report that indicates that the input binary file includes open source software.

6. The computing device of claim 1, wherein the at least one processor further causes the computing device to:
  provide, as an output, a report that indicates that the input binary file is subject to a license.

7. The computing device of claim 1, wherein the at least one processor further causes the computing device to:
  display a monetary charge associated with the input binary file.

8. The computing device of claim 1, wherein, as a result of the pairwise component analysis, a forensic determination is made as to whether particular code is common in the pairs of binary files.

9. The computing device of claim 1, wherein the pairwise component analysis is performed with respect to subsets of the pairs of binary files.

10. The computing device of claim 1, wherein the at least one processor further causes the computing device to:
  provide, as an output, a report that establishes a correspondence between at least one of: (i) code, and (ii) data items for one of the pairs of binary files.

11. The computing device of claim 1, wherein the at least one processor further causes the computing device to:
  provide, as an output, a report that correlates source code with matching subsets of one of the pairs of binary files.

12. The computing device of claim 1, wherein the at least one processor further causes the computing device to:
  automatically generate at least one report in response to a continual supply of input binary files.

13. At least one non-transitory computer readable storage medium storing instructions that, when executed by at least one processor included in a computing device, cause the computing device to:
  receive an input binary file;
  categorize, into a possible match or a mismatch, pairs of binary files consisting of (i) the input binary file, and (ii) a selected binary file included in a corpus of files;

analyze each of the pairs of binary files classified as a possible match using a pairwise component analysis that involves:
  carrying out a first process that involves exact-matching a first pair of binary files to generate a first comparison value, and
  when the first comparison value satisfies a threshold value of matching:
    preventing the first pair of binary files from being further analyzed,
    carrying out a second process that involves exact-matching a second pair of binary files to generate a second comparison value, and
    when the second comparison value does not satisfy the threshold value of matching:
      carrying out a third process that involves approximate-matching the second pair of binary files to produce a respective similarity score for the second pair of binary files; and
output the respective similarity score for at least one of the pairs of binary files.

14. The at least one non-transitory computer readable storage medium of claim 13, wherein, when the first comparison value satisfies the threshold value of matching, the at least one processor further causes the computing device to:
prevent outputting the respective similarity score for the first pair of binary files.

15. The at least one non-transitory computer readable storage medium of claim 13, wherein the at least one processor further causes the computing device to:
display a monetary charge associated with the input binary file.

16. The at least one non-transitory computer readable storage medium of claim 13, wherein the at least one processor further causes the computing device to:
automatically generate at least one report in response to a continual supply of input binary files.

17. A method, comprising:
receiving an input binary file;
categorizing, into a possible match or a mismatch, pairs of binary files consisting of (i) the input binary file, and (ii) a selected binary file included in a corpus of files;
analyzing each of the pairs of binary files classified as a possible match using a pairwise component analysis that involves:
  carrying out a first process that involves exact-matching a first pair of binary files to generate a first comparison value, and
  when the first comparison value satisfies a threshold value of matching:
    preventing the first pair of binary files from being further analyzed,
    carrying out a second process that involves exact-matching a second pair of binary files to generate a second comparison value, and
    when the second comparison value does not satisfy the threshold value of matching:
      carrying out a third process that involves approximate-matching the second pair of binary files to produce a respective similarity score for the second pair of binary files; and
outputting the respective similarity score for at least one of the pairs of binary files.

18. The method of claim 17, wherein, when the first comparison value satisfies the threshold value of matching, the method further comprises:
prevent outputting the respective similarity score for the first pair of binary files.

19. The method of claim 17, further comprising:
displaying a monetary charge associated with the input binary file.

20. The method of claim 17, further comprising:
automatically generating at least one report in response to a continual supply of input binary files.

* * * * *